(12) United States Patent
Sugano

(10) Patent No.: US 10,556,172 B2
(45) Date of Patent: Feb. 11, 2020

(54) GAMING MACHINE AND ROTATING REEL

(71) Applicant: ZESTAR Inc., Yokohama (JP)

(72) Inventor: Yutaka Sugano, Yokohama (JP)

(73) Assignee: Arzest Corp., Yokohama (JP)

( * ) Notice: Subject to any disclaimer, the term of this patent is extended or adjusted under 35 U.S.C. 154(b) by 0 days.

(21) Appl. No.: 15/328,558

(22) PCT Filed: Apr. 5, 2016

(86) PCT No.: PCT/JP2016/061178
§ 371 (c)(1),
(2) Date: Jan. 24, 2017

(87) PCT Pub. No.: WO2017/175317
PCT Pub. Date: Oct. 12, 2017

(65) Prior Publication Data
US 2019/0015734 A1    Jan. 17, 2019

(51) Int. Cl.
| G07F 17/34 | (2006.01) |
| A63F 5/04 | (2006.01) |
| A63F 5/00 | (2006.01) |
| G07F 17/32 | (2006.01) |
| A63F 13/00 | (2014.01) |

(52) U.S. Cl.
CPC ............. *A63F 5/04* (2013.01); *A63F 5/0011* (2013.01); *A63F 5/0082* (2013.01); *G07F 17/3213* (2013.01); *A63F 13/00* (2013.01); *G07F 17/34* (2013.01)

(58) Field of Classification Search
CPC ....... G07F 17/34; G07F 17/3213; A63F 13/00
USPC ................. 273/143 R, 138.2; 473/20, 31–34
See application file for complete search history.

(56) References Cited

U.S. PATENT DOCUMENTS

| 5,752,881 A | 5/1998 | Inoue | |
| 2003/0157980 A1 | 8/2003 | Loose | |
| 2005/0043084 A1* | 2/2005 | Inoue | G07F 17/32 463/20 |
| 2015/0194021 A1* | 7/2015 | Idris | G07F 17/34 463/20 |

FOREIGN PATENT DOCUMENTS

| JP | 09-075506 | 3/1997 |
| JP | 2002-035284 | 2/2002 |
| JP | 2002-143432 | 5/2002 |
| JP | 2004-261460 | 9/2004 |

(Continued)

*Primary Examiner* — Benjamin Layno
(74) *Attorney, Agent, or Firm* — Michael D. Eisenberg

(57) ABSTRACT

A gaming machine 1 with a plurality of transparent mechanical reels 51*a* to 51*e*, a plurality of motors 60*a* to 60*e* arranged respectively for spinning and stopping the transparent mechanical reels 51*a* to 51*e*, and a display 20 arranged inside of circumference of the transparent mechanical reels 51*a* to 51*e* through which the display can be visually recognized from a player's viewpoint. The gaming machine (a) generates a start signal in response to a player's operation, (b) receives the generated start signal and randomly determines a symbol to be stopped and displayed, (c) displays rotation of combination of the transparent mechanical reels 51*a* to 51*e* rotated by the motors 60*a* to 60*e* and the video reels shown on the display 20, and (d) stops the rotational display at any determined symbol and grants an award to a player.

10 Claims, 29 Drawing Sheets

(56) References Cited

FOREIGN PATENT DOCUMENTS

| JP | 2007-125163 | 5/2007 |
| JP | 2008-029727 | 2/2008 |
| JP | 2008-183379 | 8/2008 |
| JP | 2008-272106 | 11/2008 |

* cited by examiner

FIG.10
Symbol Rows of Transparent Mechanila Reels

| Position | 1st REEL | 2nd REEL | 3rd REEL | 4th REEL | 5th REEL |
|---|---|---|---|---|---|
| 1 | No Symbol | No Symbol | No Symbol | No Symbol | No Symbol |
| 2 | No Symbol | No Symbol | No Symbol | No Symbol | No Symbol |
| 3 | No Symbol | No Symbol | No Symbol | No Symbol | No Symbol |
| 4 | No Symbol | No Symbol | No Symbol | No Symbol | No Symbol |
| 5 | No Symbol | No Symbol | No Symbol | No Symbol | No Symbol |
| 6 | 10 | J | Q | J | Q |
| 7 | 7 | DINO3 | DINO3 | DINO3 | DINO2 |
| 8 | J | K | 9 | Q | K |
| 9 | DINO2 | DINO1 | DINO4 | DINO2 | DINO1 |
| 10 | Q | Q | A | K | 9 |
| 11 | DINO3 | DINO2 | DINO1 | DINO4 | DINO2 |
| 12 | K | 10 | Q | 10 | J |
| 13 | WILD | WILD | WILD | WILD | WILD |
| 14 | A | A | 10 | J | Q |
| 15 | DINO4 | DINO3 | DINO2 | DINO1 | DINO4 |
| 16 | 9 | Q | 9 | 10 | 10 |
| 17 | DINO1 | DINO2 | DINO4 | DINO2 | DINO3 |
| 18 | 10 | 10 | K | A | J |
| 19 | DINO2 | DINO1 | DINO3 | DINO3 | DINO1 |
| 20 | J | K | J | 9 | 10 |
| 21 | TRIGGER | TRIGGER | TRIGGER | TRIGGER | TRIGGER |
| 22 | Q | 9 | A | Q | A |
| 23 | DINO3 | DINO4 | DINO2 | DINO1 | DINO4 |
| 24 | 9 | A | 10 | J | 9 |

FIG.13A
Reel Symbol Rows (Normal Times)

| Position | 1st REEL | 2nd REEL | 3rd REEL | 4th REEL | 5th REEL |
|---|---|---|---|---|---|
| 1 | DINO1 | DINO1 | DINO1 | DINO1 | DINO1 |
| 2 | DINO1 | DINO1 | DINO1 | DINO1 | DINO1 |
| 3 | DINO1 | DINO1 | DINO1 | DINO1 | DINO1 |
| 4 | DINO1 | DINO1 | DINO1 | DINO1 | DINO1 |
| 5 | DINO1 | DINO1 | DINO1 | DINO1 | DINO1 |
| 6 | 10 | J | Q | J | Q |
| 7 | DINO1 | DINO3 | DINO3 | DINO3 | DINO2 |
| 8 | J | K | 9 | Q | K |
| 9 | DINO2 | DINO1 | DINO4 | DINO2 | DINO1 |
| 10 | Q | Q | A | K | 9 |
| 11 | DINO3 | DINO2 | DINO1 | DINO4 | DINO2 |
| 12 | K | 10 | Q | 10 | J |
| 13 | WILD | WILD | WILD | WILD | WILD |
| 14 | A | A | 10 | J | Q |
| 15 | DINO4 | DINO3 | DINO2 | DINO1 | DINO4 |
| 16 | 9 | Q | 9 | 10 | 10 |
| 17 | DINO1 | DINO2 | DINO4 | DINO2 | DINO3 |
| 18 | 10 | 10 | K | A | J |
| 19 | DINO2 | DINO1 | DINO3 | DINO3 | DINO1 |
| 20 | J | K | J | 9 | 10 |
| 21 | TRIGGER | TRIGGER | TRIGGER | TRIGGER | TRIGGER |
| 22 | Q | 9 | A | Q | A |
| 23 | DINO3 | DINO4 | DINO2 | DINO1 | DINO4 |
| 24 | 9 | A | 10 | J | 9 |
| 25 | DINO3 | DINO3 | DINO3 | DINO3 | DINO3 |
| 26 | DINO3 | DINO3 | DINO3 | DINO3 | DINO3 |
| 27 | DINO3 | DINO3 | DINO3 | DINO3 | DINO3 |
| 28 | DINO3 | DINO3 | DINO3 | DINO3 | DINO3 |
| 29 | DINO3 | DINO3 | DINO3 | DINO3 | DINO3 |
| 30 | 10 | J | Q | J | Q |
| 31 | DINO1 | DINO3 | DINO3 | DINO3 | DINO2 |
| 32 | J | K | 9 | Q | K |
| 33 | DINO2 | DINO1 | DINO4 | DINO2 | DINO1 |
| 34 | Q | Q | A | K | 9 |
| 35 | DINO3 | DINO2 | DINO1 | DINO4 | DINO2 |
| 36 | K | 10 | Q | 10 | J |
| 37 | WILD | WILD | WILD | WILD | WILD |
| 38 | A | A | 10 | J | Q |
| 39 | DINO4 | DINO3 | DINO2 | DINO1 | DINO4 |
| 40 | 9 | Q | 9 | 10 | 10 |
| 41 | DINO1 | DINO2 | DINO4 | DINO2 | DINO3 |
| 42 | 10 | 10 | K | A | J |
| 43 | DINO2 | DINO1 | DINO3 | DINO3 | DINO1 |
| 44 | J | K | J | 9 | 10 |
| 45 | TRIGGER | TRIGGER | TRIGGER | TRIGGER | TRIGGER |
| 46 | Q | 9 | A | Q | A |
| 47 | DINO3 | DINO4 | DINO2 | DINO1 | DINO4 |
| 48 | 9 | A | 10 | J | 9 |

FIG.13B

| | | | | | |
|---|---|---|---|---|---|
| 49 | DINO2 | DINO2 | DINO2 | DINO2 | DINO2 |
| 50 | DINO2 | DINO2 | DINO2 | DINO2 | DINO2 |
| 51 | DINO2 | DINO2 | DINO2 | DINO2 | DINO2 |
| 52 | DINO2 | DINO2 | DINO2 | DINO2 | DINO2 |
| 53 | DINO2 | DINO2 | DINO2 | DINO2 | DINO2 |
| 54 | 10 | J | Q | J | Q |
| 55 | DINO1 | DINO3 | DINO3 | DINO3 | DINO2 |
| 56 | J | K | 9 | Q | K |
| 57 | DINO2 | DINO1 | DINO4 | DINO2 | DINO1 |
| 58 | Q | Q | A | K | 9 |
| 59 | DINO3 | DINO2 | DINO1 | DINO4 | DINO2 |
| 60 | K | 10 | Q | 10 | J |
| 61 | WILD | WILD | WILD | WILD | WILD |
| 62 | A | A | 10 | J | Q |
| 63 | DINO4 | DINO3 | DINO2 | DINO1 | DINO4 |
| 64 | 9 | Q | 9 | 10 | 10 |
| 65 | DINO1 | DINO2 | DINO4 | DINO2 | DINO3 |
| 66 | 10 | 10 | K | A | J |
| 67 | DINO2 | DINO1 | DINO3 | DINO3 | DINO1 |
| 68 | J | K | J | 9 | 10 |
| 69 | TRIGGER | TRIGGER | TRIGGER | TRIGGER | TRIGGER |
| 70 | Q | 9 | A | Q | A |
| 71 | DINO3 | DINO4 | DINO2 | DINO1 | DINO4 |
| 72 | 9 | A | 10 | J | 9 |
| 73 | DINO4 | DINO4 | DINO4 | DINO4 | DINO4 |
| 74 | DINO4 | DINO4 | DINO4 | DINO4 | DINO4 |
| 75 | DINO4 | DINO4 | DINO4 | DINO4 | DINO4 |
| 76 | DINO4 | DINO4 | DINO4 | DINO4 | DINO4 |
| 77 | DINO4 | DINO4 | DINO4 | DINO4 | DINO4 |
| 78 | 10 | J | Q | J | Q |
| 79 | DINO1 | DINO3 | DINO3 | DINO3 | DINO2 |
| 80 | J | K | 9 | Q | K |
| 81 | DINO2 | DINO1 | DINO4 | DINO2 | DINO1 |
| 82 | Q | Q | A | K | 9 |
| 83 | DINO3 | DINO2 | DINO1 | DINO4 | DINO2 |
| 84 | K | 10 | Q | 10 | J |
| 85 | WILD | WILD | WILD | WILD | WILD |
| 86 | A | A | 10 | J | Q |
| 87 | DINO4 | DINO3 | DINO2 | DINO1 | DINO4 |
| 88 | 9 | Q | 9 | 10 | 10 |
| 89 | DINO1 | DINO2 | DINO4 | DINO2 | DINO3 |
| 90 | 10 | 10 | K | A | J |
| 91 | DINO2 | DINO1 | DINO3 | DINO3 | DINO1 |
| 92 | J | K | J | 9 | 10 |
| 93 | TRIGGER | TRIGGER | TRIGGER | TRIGGER | TRIGGER |
| 94 | Q | 9 | A | Q | A |
| 95 | DINO3 | DINO4 | DINO2 | DINO1 | DINO4 |
| 96 | 9 | A | 10 | J | 9 |

FIG.14A
Reel Symbol Rows (Jackpot Times)

| Position | 1st REEL | 2nd REEL | 3rd REEL | 4th REEL | 5th REEL |
|---|---|---|---|---|---|
| 1~20 | DINO1 | DINO1 | DINO1 | DINO1 | DINO1 |
| 21 | 10 | J | Q | J | Q |
| 22 | DINO1 | DINO3 | DINO3 | DINO3 | DINO2 |
| 23 | J | K | 9 | Q | K |
| 24 | DINO2 | DINO1 | DINO4 | DINO2 | DINO1 |
| 25 | Q | Q | A | K | 9 |
| 26 | DINO3 | DINO2 | DINO1 | DINO4 | DINO2 |
| 27 | K | 10 | Q | 10 | J |
| 28 | WILD | WILD | WILD | WILD | WILD |
| 29 | A | A | 10 | J | Q |
| 30 | DINO4 | DINO3 | DINO2 | DINO1 | DINO4 |
| 31 | 9 | Q | 9 | 10 | 10 |
| 32 | DINO1 | DINO2 | DINO4 | DINO2 | DINO3 |
| 33 | 10 | 10 | K | A | J |
| 34 | DINO2 | DINO1 | DINO3 | DINO3 | DINO1 |
| 35 | J | K | J | 9 | 10 |
| 36 | TRIGGER | TRIGGER | TRIGGER | TRIGGER | TRIGGER |
| 37 | Q | 9 | A | Q | A |
| 38 | DINO3 | DINO4 | DINO2 | DINO1 | DINO4 |
| 39 | 9 | A | 10 | J | 9 |
| 40~59 | DINO3 | DINO3 | DINO3 | DINO3 | DINO3 |
| 60 | 10 | J | Q | J | Q |
| 61 | DINO1 | DINO3 | DINO3 | DINO3 | DINO2 |
| 62 | J | K | 9 | Q | K |
| 63 | DINO2 | DINO1 | DINO4 | DINO2 | DINO1 |
| 64 | Q | Q | A | K | 9 |
| 65 | DINO3 | DINO2 | DINO1 | DINO4 | DINO2 |
| 66 | K | 10 | Q | 10 | J |
| 67 | WILD | WILD | WILD | WILD | WILD |
| 68 | A | A | 10 | J | Q |
| 69 | DINO4 | DINO3 | DINO2 | DINO1 | DINO4 |
| 70 | 9 | Q | 9 | 10 | 10 |
| 71 | DINO1 | DINO2 | DINO4 | DINO2 | DINO3 |
| 72 | 10 | 10 | K | A | J |
| 73 | DINO2 | DINO1 | DINO3 | DINO3 | DINO1 |
| 74 | J | K | J | 9 | 10 |
| 75 | TRIGGER | TRIGGER | TRIGGER | TRIGGER | TRIGGER |
| 76 | Q | 9 | A | Q | A |
| 77 | DINO3 | DINO4 | DINO2 | DINO1 | DINO4 |
| 78 | 9 | A | 10 | J | 9 |

FIG.14B

| 79~98 | DINO2 | DINO2 | DINO2 | DINO2 | DINO2 |
|---|---|---|---|---|---|
| 99 | 10 | J | Q | J | Q |
| 100 | DINO1 | DINO3 | DINO3 | DINO3 | DINO2 |
| 101 | J | K | 9 | Q | K |
| 102 | DINO2 | DINO1 | DINO4 | DINO2 | DINO1 |
| 103 | Q | Q | A | K | 9 |
| 104 | DINO3 | DINO2 | DINO1 | DINO4 | DINO2 |
| 105 | K | 10 | Q | 10 | J |
| 106 | WILD | WILD | WILD | WILD | WILD |
| 107 | A | A | 10 | J | Q |
| 108 | DINO4 | DINO3 | DINO2 | DINO1 | DINO4 |
| 109 | 9 | Q | 9 | 10 | 10 |
| 110 | DINO1 | DINO2 | DINO4 | DINO2 | DINO3 |
| 111 | 10 | 10 | K | A | J |
| 112 | DINO2 | DINO1 | DINO3 | DINO3 | DINO1 |
| 113 | J | K | J | 9 | 10 |
| 114 | TRIGGER | TRIGGER | TRIGGER | TRIGGER | TRIGGER |
| 115 | Q | 9 | A | Q | A |
| 116 | DINO3 | DINO4 | DINO2 | DINO1 | DINO4 |
| 117 | 9 | A | 10 | J | 9 |
| 118~137 | DINO4 | DINO4 | DINO4 | DINO4 | DINO4 |
| 138 | 10 | J | Q | J | Q |
| 139 | DINO1 | DINO3 | DINO3 | DINO3 | DINO2 |
| 140 | J | K | 9 | Q | K |
| 141 | DINO2 | DINO1 | DINO4 | DINO2 | DINO1 |
| 142 | Q | Q | A | K | 9 |
| 143 | DINO3 | DINO2 | DINO1 | DINO4 | DINO2 |
| 144 | K | 10 | Q | 10 | J |
| 145 | WILD | WILD | WILD | WILD | WILD |
| 146 | A | A | 10 | J | Q |
| 147 | DINO4 | DINO3 | DINO2 | DINO1 | DINO4 |
| 148 | 9 | Q | 9 | 10 | 10 |
| 149 | DINO1 | DINO2 | DINO4 | DINO2 | DINO3 |
| 150 | 10 | 10 | K | A | J |
| 151 | DINO2 | DINO1 | DINO3 | DINO3 | DINO1 |
| 152 | J | K | J | 9 | 10 |
| 153 | TRIGGER | TRIGGER | TRIGGER | TRIGGER | TRIGGER |
| 154 | Q | 9 | A | Q | A |
| 155 | DINO3 | DINO4 | DINO2 | DINO1 | DINO4 |
| 156 | 9 | A | 10 | J | 9 |

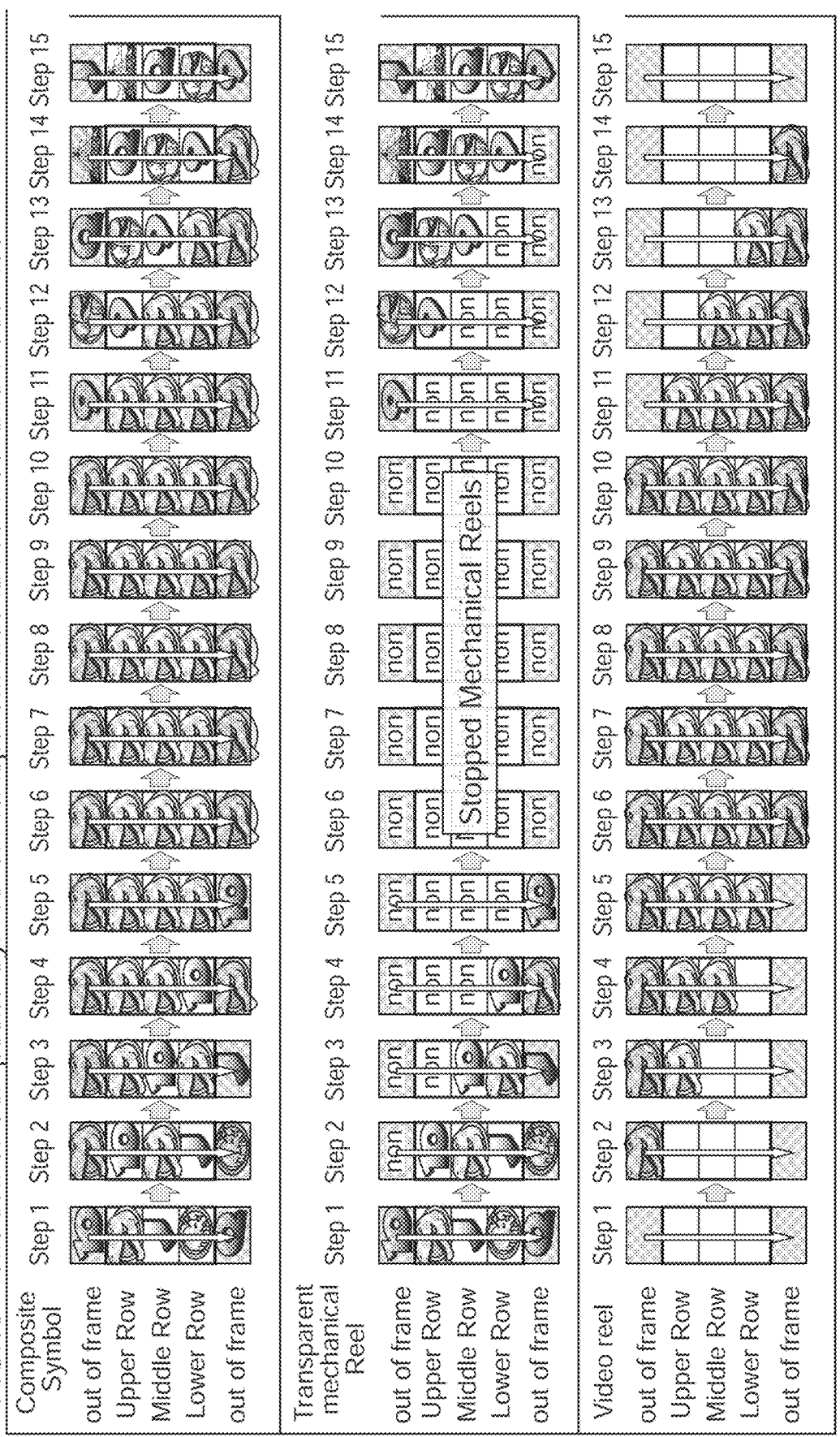

FIG.26
Transparent Mechanical Reel Symbol Rows

| Position | 1st REEL | 2nd REEL | 3rd REEL |
|---|---|---|---|
| 1 | 10 | J | Q |
| 2 | 7 | DINO3 | DINO2 |
| 3 | J | K | K |
| 4 | DINO2 | DINO1 | DINO1 |
| 5 | Q | Q | 9 |
| 6 | DINO3 | DINO2 | DINO2 |
| 7 | K | 10 | J |
| 8 | WILD | WILD | WILD |
| 9 | A | A | Q |
| 10 | DINO4 | DINO3 | DINO4 |
| 11 | 9 | Q | 10 |
| 12 | DINO1 | DINO2 | DINO3 |
| 13 | 10 | 10 | J |
| 14 | DINO2 | DINO1 | DINO1 |
| 15 | J | K | 10 |
| 16 | TRIGGER | TRIGGER | TRIGGER |
| 17 | Q | 9 | A |
| 18 | DINO3 | DINO4 | DINO4 |
| 19 | 9 | A | 9 |

GAMING MACHINE AND ROTATING REEL

FIELD OF THE INVENTION

The present invention relates to gaming machines and rotating reels used for the gaming machines.

DESCRIPTION OF THE RELATED ART

Conventionally, it is known that a gaming machine using a rotating reel such as a slot machine, a pachislot or a pachinko with a display indicating an image causes effect of a game to be visually entertained. In particular, it is also known that a gaming machine can be played only with a video reel indicated on a display without using mechanical rotating reels. On the other hand, among pachislot machines, it is known that a gaming machine that performs rendition with a combination of mechanical rotating reels and a display (for example, Patent Literature 1).

As an example of this combination, the Patent Literature 1 discloses a gaming machine in which a display screen is provided on the front side as viewed from the player's point of view, and mechanical rotating reels are provided behind the display.

Also, as for rotating reels of a gaming machine, there is contrivance as a conventional technique. That is, since symbols are placed on rotating reels of a gaming machine, a player visually recognizes them without distraction. Consequently, devising display of these symbols can improve attractiveness of a gaming machine. For example, Patent Literature 2 discloses rotating reels which make symbols characteristically visible by three-dimensionally projecting symbols on outer circumferential surface of the rotating reels.

PRIOR ART DOCUMENTS

Patent Literature

Patent Literature 1: Japanese Unexamined Patent Application Publication No. 2008-183379
Patent Literature 2: Japanese Unexamined Patent Application Publication No. 2007-125163

SUMMARY OF THE INVENTION

However, in the gaming machine of Patent Literature 1, when mechanical rotating reels are visually recognized, since there is a display in front of the rotating reels, it is sometimes difficult for a player to visually recognize the symbols on the rotating reels. For example, in the cases where the rendered image is displayed on the entire display, the brightness of the display is high and the scene behind the display can not be seen through, it becomes difficult for a player to visually recognize the rotating reels clearly.

Further, in Patent Literature 1, the surface of the screen indicating the image of the display is flat. Therefore, although the video reel can be indicated on this display, since the curvatures of the mechanical rotating reels and the video reels shown on the display are different, when these are used in combination, it is impossible to view the reels together, a sense of incongruity may occur in some cases. As a result, there is room for improvement in playing a game with a combination of mechanical rotating reels and video reels indicated on the display. In addition, in Patent Literature 1, it is also difficult to construct one symbol with combining one symbol of the mechanical rotating reel and one symbol on the video reel indicated on the display.

Additionally, in Patent Literature 2, one symbol itself is stereoscopically rendered, and only a stereoscopic effect is produced on the symbol. For this reason, for example, it is impossible to produce a stereoscopic effect of a symbol by superimposing symbols on a plurality of layers such as a foreground and a background and by superimposing a plurality of layers when viewed from the player.

The object of the present invention is to solve the above-mentioned problems in the prior art, and to provide a gaming machine with further improved attractiveness by providing rotating reels or a reel unit having a structure that has not been provided in the past for rendering effect which visually entertains a player at a gaming machine.

A first aspect in accordance with the present invention comprises a plurality of transparent mechanical reels, a motor disposed on each of the transparent mechanical reels for rotating and stopping the transparent mechanical reels, a display arranged inside the circumference of the transparent mechanical reels and visually recognized through the transparent mechanical reels from the viewpoint of the player, and a processor causing to:

(a) in response to an operation by a player, generate a start signal, (b) receive the generated start signal and determine symbols to be stopped and displayed in accordance with random selection, (c) display rotation of combination of the transparent mechanical reels rotated by the motor and video reels indicated on the display, and (d) stop the rotating display at the determined symbols and provide an award to the player. Therefore, it is possible to provide a gaming machine combining the transparent mechanical reels and the video reels with a structure that is not conventionally available.

In accordance with a second aspect of the present invention, based on the first aspect of the present invention, a player can see representation on a display located behind the transparent mechanical reels through at least either of the symbols placed on the surface of the mechanical reels or periphery thereof since the entirety of the transparent mechanical reels or surfaces of the transparent mechanical reels on which symbols are placed are composed of transparent materials.

In accordance with a third aspect of the present invention, based on the first aspect of the present invention, a plurality of symbols are placed uniformly at a predetermined distance on each of the transparent mechanical reels of which prescribed number of frames are in a transparent state without any symbol, and the transparent mechanical reel has non-symbol transparent portion through which a player can visually recognize the display behind the transparent mechanical reel.

In accordance with a fourth aspect of the present invention, based on a first aspect of the present invention, the processor causes the non-symbol transparent portion to be stopped in front of a player from the viewpoint of the player and causes the video reel symbols to be shown on the display in such state, and thereby a symbol column longer than the symbol column on the transparent mechanical reel can be displayed.

In accordance with a fifth invention of the present invention, based on a first invention, the processor is configured to display one composite winning symbol by combining the symbols placed on the transparent mechanical reel with the symbols in the video reel shown on the display.

In accordance with a sixth aspect of the present invention, based on a first aspect of the present invention, spinning of the transparent mechanical reel is conducted by engagement of a gear provided at a front end portion of the transparent mechanical reel and a gear of the motor, and an auxiliary body provided on the outer peripheral side of the transparent mechanical reel which fixes the spinning position of the transparent mechanical reel causes the transparent mechanical reel to spin at a fixed position. Therefore, since the mechanical reel is not structured like the conventional mechanical reel wherein a shaft is provided at the center of the mechanical reel and the rotation shaft of the motor is connected to the central shaft for spinning the reel, a display can be disposed inside the reel and the reel can be spinned.

In accordance with a seventh aspect of the present invention, a plurality of transparent mechanical reels, a motor disposed on each of the transparent mechanical reels for spinning and stopping the transparent mechanical reel, a display disposed inside a circumference of the transparent mechanical reels which can be visually recognized through the transparent mechanical reels from a viewpoint of a player, a stop switch for stopping the rotation of the transparent mechanical reel; and a processor to:

(a) generate a start signal in response to an operation by a player, (b) receive the generated start signal and determine a combination of symbols to be stopped and displayed in accordance with random selection, (c) spin and display the transparent mechanical reel by the motor, and (d) stop the rotating display of the transparent mechanical reel in accordance with the operation of the stop switch and a combination of the determined symbols and provide an award to the player, are provided.

The present invention provides a gaming machine with further improved amusement by offering rotating reels and a reel unit having a structure which has not been seen in the conventional art for rendering visual entertainment to a player.

BRIEF DESCRIPTION OF THE DRAWINGS

FIG. 10 is a symbol row of a transparent mechanical reel 51 in accordance with the first embodiment of the present invention.

FIG. 13A and FIG. 13B are a reel symbol row (in a normal state) in accordance with the first embodiment of the present invention.

FIG. 14A and FIG. 14B a reel symbol row (in a jackpot state) in accordance with the first embodiment of the present invention.

FIG. 15 is a schematic view showing transition of symbols synthesized by a transparent mechanical reel 51 and a video reel in accordance with the first embodiment of the present invention.

FIG. 26 is a symbol row of the transparent mechanical reel 52 in accordance with the second embodiment of the present invention.

EMBODIMENTS FOR CARRYING OUT THE INVENTION

The present invention is described below more specifically with reference to preferred embodiments, provided, however, that the embodiments below are just samples which embody the present invention and not limited to these embodiments.

[First Embodiment]

The gaming machine 1 in accordance with a first embodiment is explained with reference to drawings. The slot machine 1 in accordance with the present embodiment has a display capable of showing images and physical transparent mechanical reels.

The gaming machine 1 is a slot machine that performs games by combining image view (symbols and image rendition) by the display and symbols placed on the transparent mechanical reels.

[Appearance]

Figure 1:
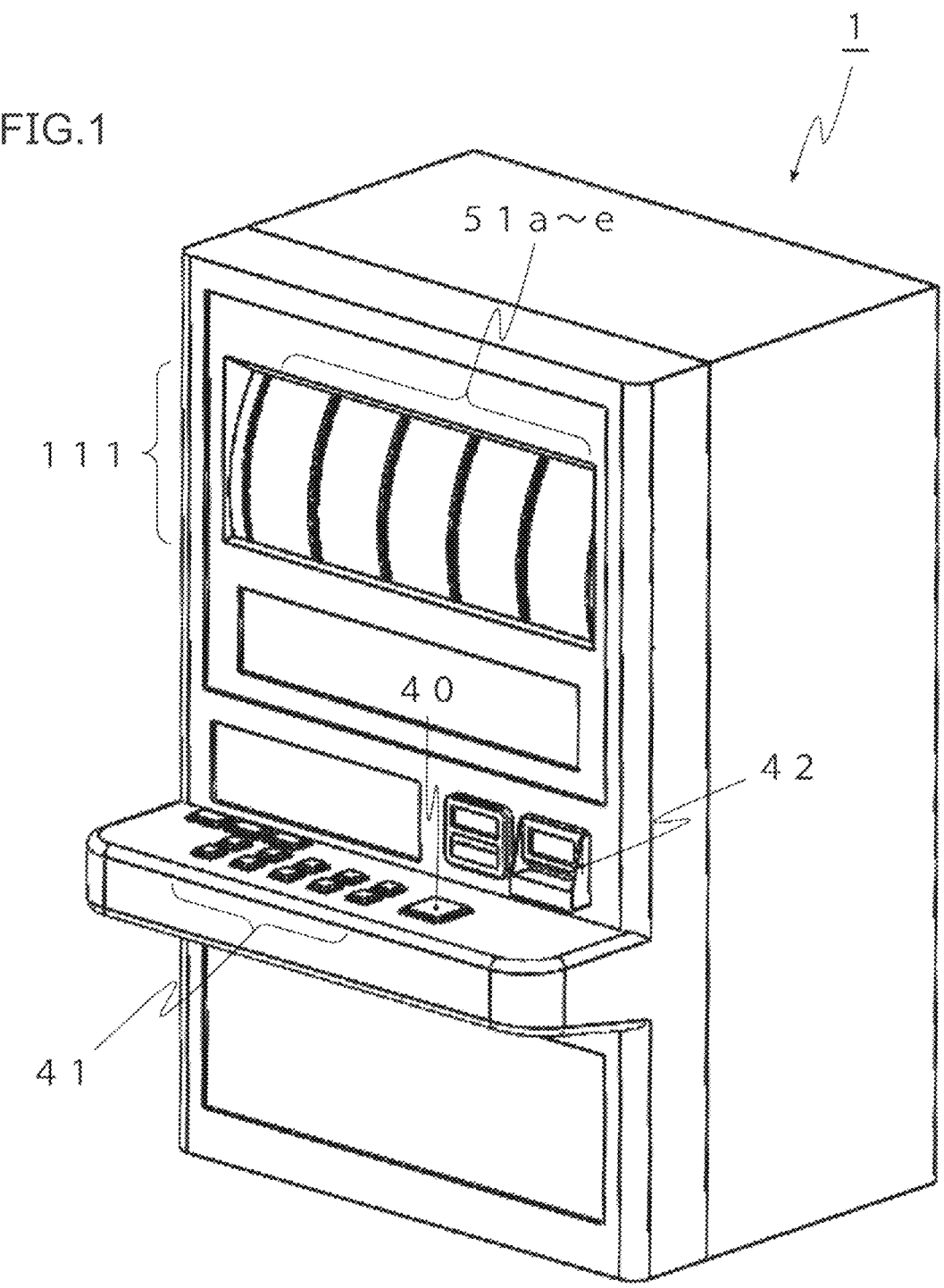
FIG. 1 shows an appearance of a gaming machine 1 in accordance with a first embodiment of the present invention.

FIG. 1 is an external perspective view of a gaming machine 1 in accordance with the first embodiment. The gaming machine 1 may be an upright type slot machine installed in a gaming venue such as a casino. The gaming machine 1 has a cabinet in which mechanical devices and electric parts for performing a game are stored.

The gaming machine 1 receives a prepaid card, a credit card, a medal, and the like as credits from a player from a credit storage unit 42 and starts reception of the game. When the player operates the start switch 40 and the BET switch 41, the transparent mechanical reel 51 spins and the result of the game is shown on the symbol display area 111. In this example, the gaming machine 1 has a mechanical video reel unit 5 with a symbol display area 111 inside the front upper part of the front of the cabinet.

The symbol display area 111 is a display area on which symbols are stopped and displayed as a result of a game with the rotation of the five transparent mechanical reels 51 $a$ to 51 $e$, and in this example, is composed of vertical three frames and horizontal five frames as a matrix. In other words, while the number of vertical symbols of the matrix displayed on the display 20 is five, the number of vertical symbols of the symbol display area 111 is three. Details are described later. However, unlike this example, the number of symbols displayed on the symbol display area 111 may indicate equal to or less than the number of symbols of the matrix displayed on the display 20. A winning is determined in accordance with the symbols stopped at the symbol display area 111.

[Configuration of Mechanical Video Reel Unit]

Figure 2:
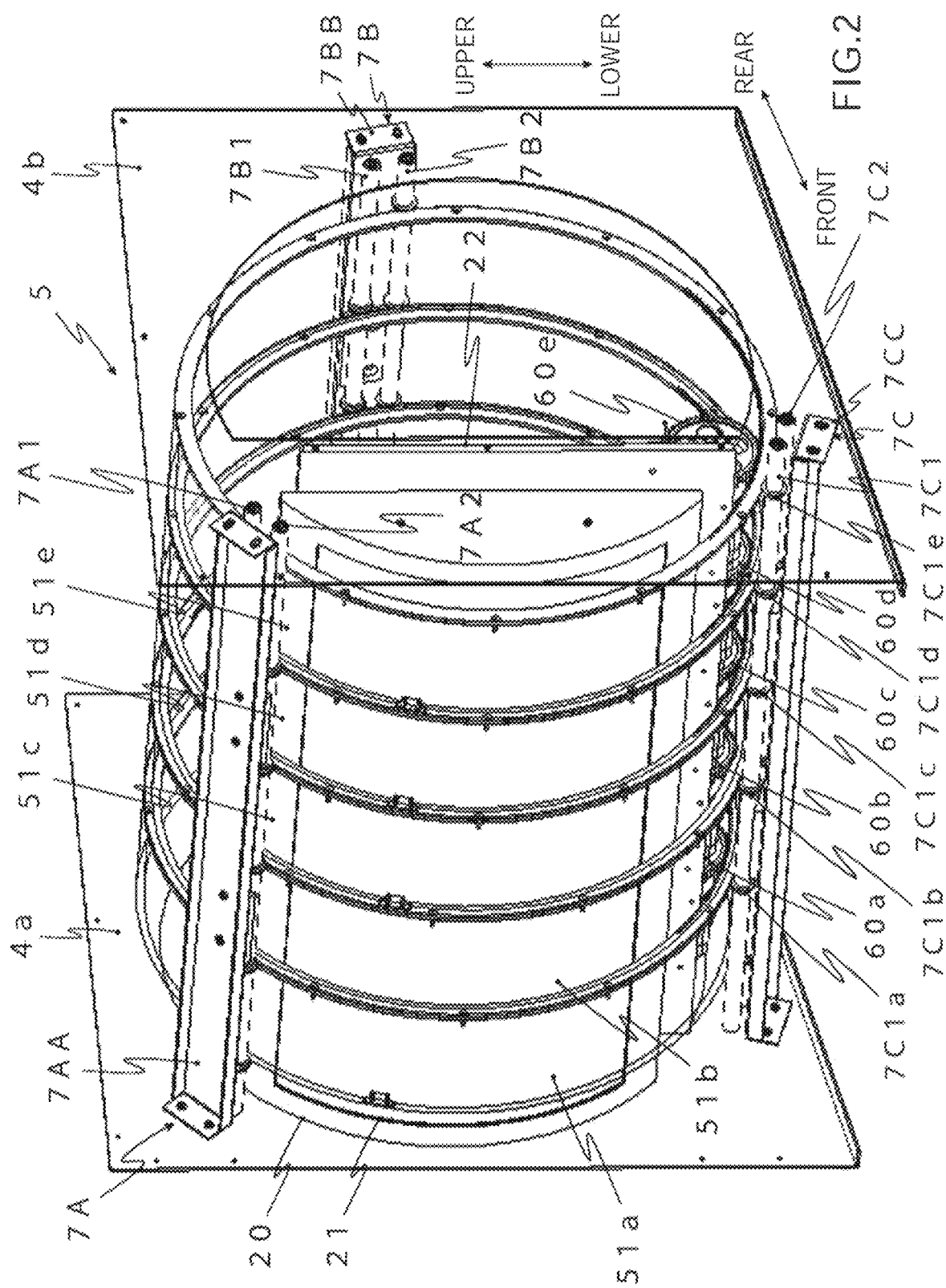
FIG. 2 is an internal structural view (front perspective view) of the mechanical video reel unit 5 in accordance with the first embodiment of the present invention.

FIG. 2 is a perspective view of the mechanical video reel unit 5. In this figure, symbols on reels are not shown in order to express the internal structure clearly. The mechanical video reel unit 5 at least comprises transparent mechanical reels 51$a$ to 51$e$ (hereinafter simply referred to as "51" in the case of not describing individual transparent mechanical reel), a display 20 disposed inside thereof, motors 60$a$ to 60$e$ each of which rotates each of the transparent mechanical reels 51$a$ to 51$e$ (hereinafter simply referred to as "60" in the case of not explaining individual motor), reel spinning auxiliary bodies 7A, 7B and 7C (hereinafter simply referred to as "7" in the case of not explaining individual reel spinning auxiliary body) which fixes the transparent mechanical reels 51 to the prescribed location without interrupting their spinning, and right and left side fixing plates 4$a$ and 4$b$. The figure shows the minimum configuration for explaining the concept of the present embodiment, and it includes wiring harnesses and other fixtures when necessary.

In FIG. 2, while the front and rear are defined by arrows, when a player playing a game is located in front of the gaming machine 1, the direction from the gaming machine 1 to the player is set as the forward direction. Therefore, when viewing the display 20 and the transparent mechanical reels 51, it is possible to visually recognize the screen in front of the display 20 from the viewpoint of the player.

The transparent mechanical reels 51 are circular mechanical reels, wherein a plurality of symbols are placed on the entire reels or the reel surface composed of a transparent material so that the scene behind the reels can be visually recognized. The transparent mechanical reels 51 are plurally arranged in the lateral direction (five in the present embodiment), so that the transparent mechanical reels 51 have cylindrical shape as if a drum is laid as a whole. In the following description, while the number of the transparent mechanical reels 51 are described by five, this number may be any number as long as it is two or more.

Figure 5:
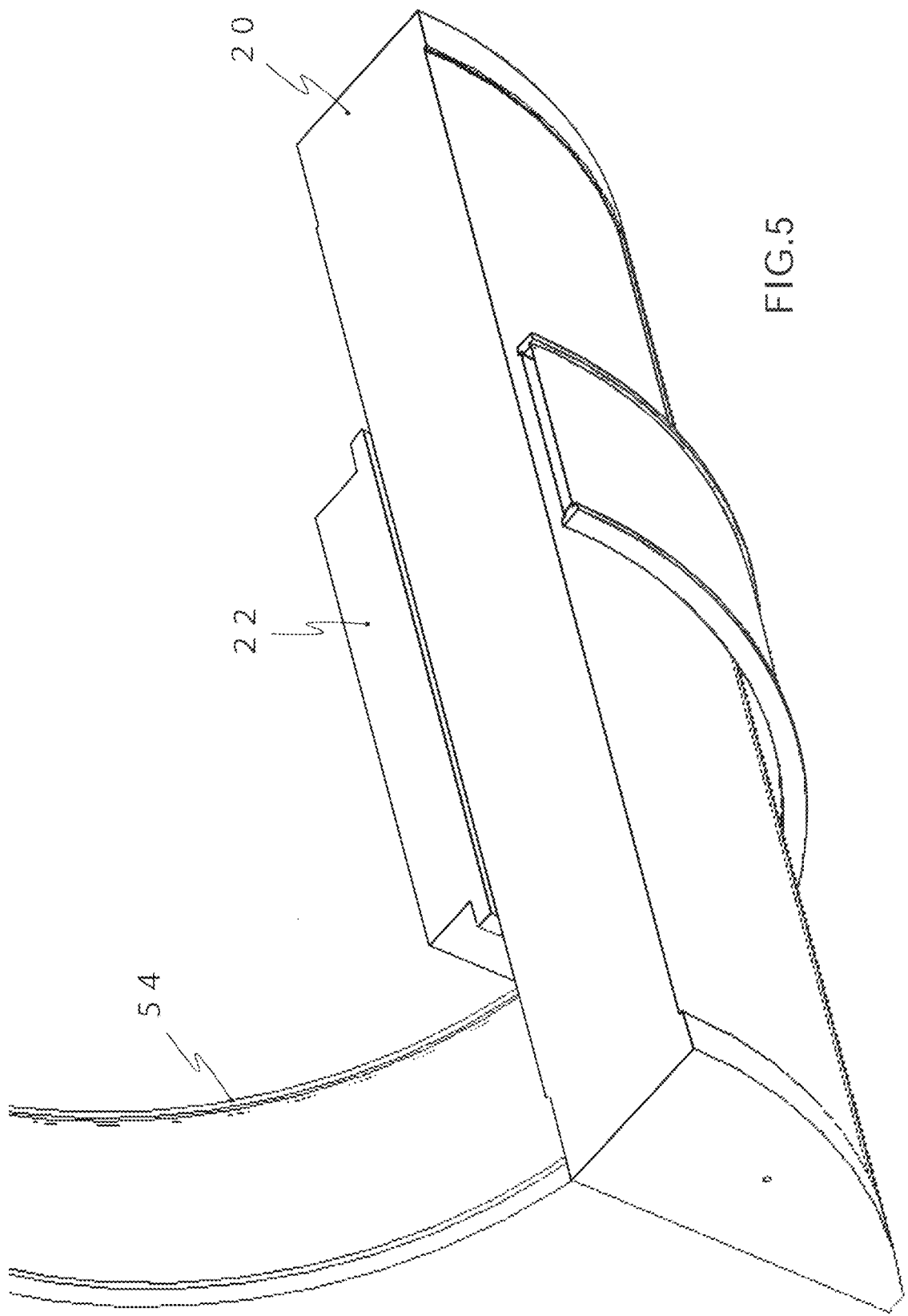
FIG. 5 is a cross-sectional view of the transparent mechanical reel 51, the display 20, and the display fixing plate 22 sectioned in the horizontal direction in accordance with the first embodiment of the present invention.

The display 20 is a display device for indicating images such as various still images and moving images, and may be, for example, a liquid crystal display, an organic EL display, an LED display, a plasma display or the like. The image showing surface of the display 20 is not a flat surface but a curved surface that draws an arc bulging in the vertical direction of the display 20. It is desirable that the curvature of this curved surface is substantially the same as the curvature of the transparent mechanical reel 51. FIG. 5 is a view in which the reel strip 54 used for the transparent mechanical reel 51 and the display 20 are sectioned in the horizontal direction.

As shown in FIG. 5, it is desirable that the arc of the surface of the display 20 has substantially the same center as the center of the transparent mechanical reel 51. As described above, since the curvatures are substantially the same, it is possible to show the combination of the symbols arranged on the transparent mechanical reels 51 and the symbols on the video reels or the image rendition displayed on the display 20 behind the transparent mechanical reels 51 to a player with less unnatural feelings.

As shown in FIG. 2, it is desirable that the size in the horizontal direction of the image display area 21 of the display 20 is substantially the same as or larger than the total value of the widths of the transparent mechanical reels 51$a$ to 51$e$ which are arranged horizontally. It is also desirable that the vertical size of the image display area 21 of the display 20, namely the length of the circular arc of the area where the image is displayed (size of a frame of matrix in the vertical direction) is equal to the integral multiple of the vertical size of the symbols placed on the transparent mechanical reels since the surface is curved in the vertical direction.

The display 20 is fixed by the display fixing plate 22 located in the back of the display 20. The display fixing plate 22 is fixed to the mechanical video reel unit 5 by side fixing plates 4$a$ and 4$b$ located on the side thereof.

Figure 3:
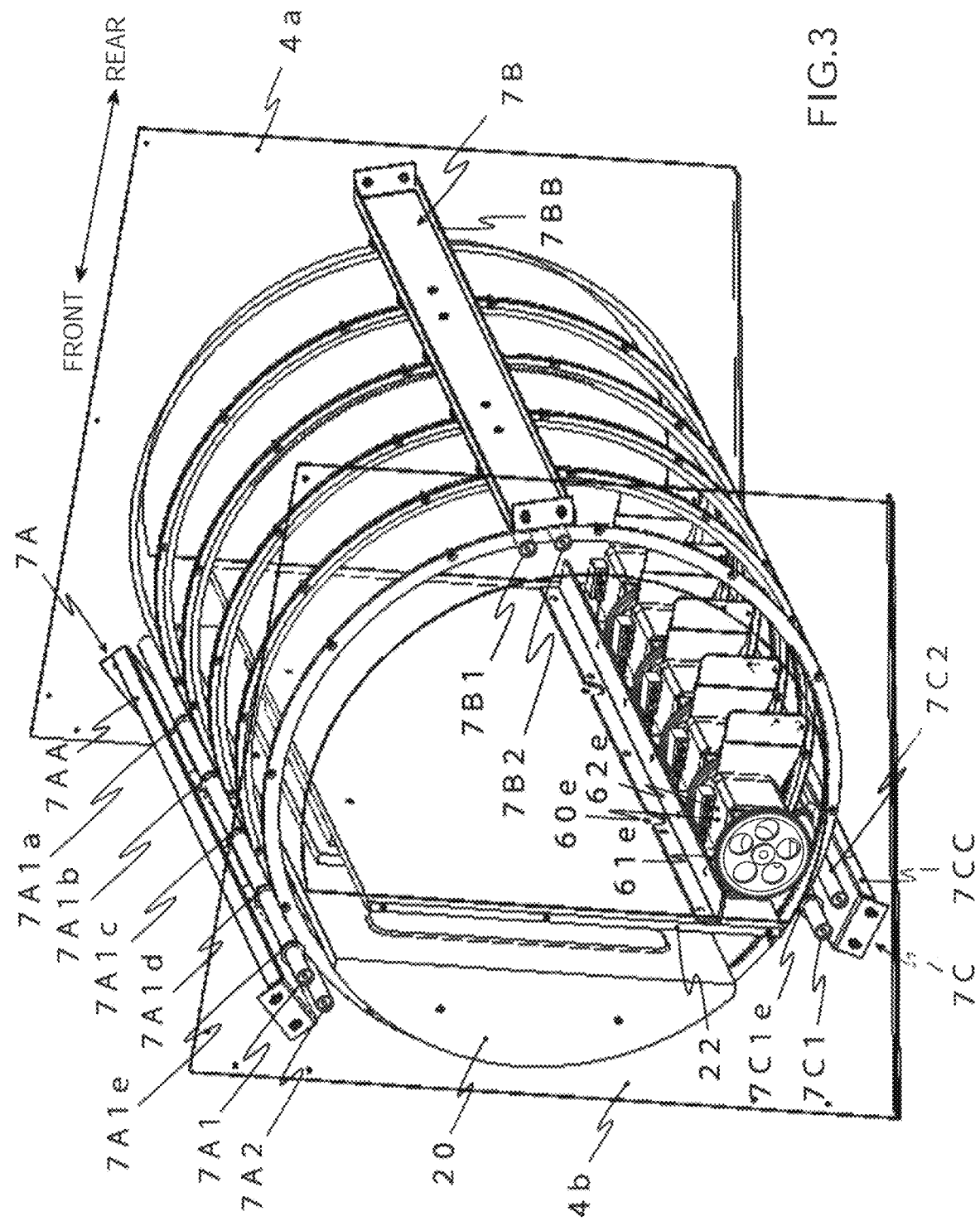
FIG. 3 is an internal structural view (rear perspective view) of the mechanical video reel unit 5 in accordance with the first embodiment of the present invention.

The motors 60 are disposed at the lower part behind the display 20 and inside the transparent mechanical reels 51. In FIG. 2, while the location of the motors 60 is the lower part of the display 20, it may be located at the upper part thereof or may be provided at the same height as the center of the display 20. As shown in FIG. 3, one of the motors 60 is provided corresponding to one of the transparent mechanical reels 51. That is, a motor 60a is used to rotate the transparent mechanical reel 51a, a motor 60b is used to rotate the transparent mechanical reel 51b, a motor 60c is used to rotate the transparent mechanical reel 51c, a motor 60d is used to rotate 51d and a motor 60e is used to rotate the transparent mechanical reel 51e.

Figure 4:
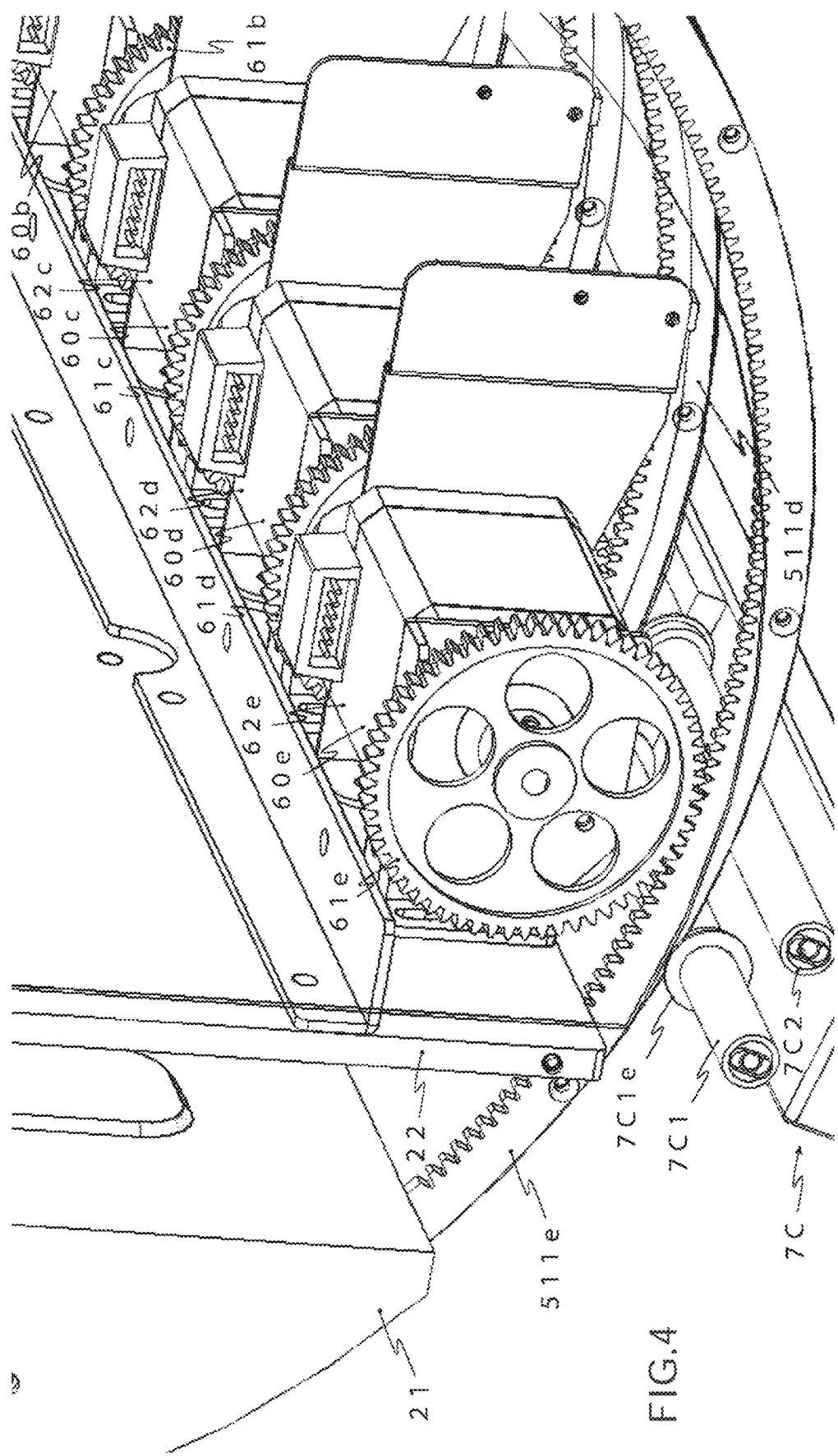
FIG. 4 is an internal structural view (enlarged view of a rear perspective view of a motor) of the mechanical video reel unit 5 in accordance with the first embodiment of the present invention.

The motors 60 may be so-called stepping motors, and are composed of motor gears 61a to 61e for spinning the transparent mechanical reels 51a to 51e and motor main bodies 62a to 62e which rotate according to instructions from the motor driving circuit 56. As shown in FIG. 4, the motor gears 61a to 61e (the motor gear 61e in the figure) engage with the geared reel frames 511a to 511e provided at the end portions of the reel surfaces of the transparent mechanical reels 51a to 51e, causing the transparent mechanical reels 51a to 51e to spin. Here, the geared reel frames 511a to 511e have gears (the crests of the gears facing toward the center) on the inner diameter side, and mesh with the motor gears 61a to 61e having gears on the outer diameter side, causing the transparent mechanical reels 51a to 51e to spin. In the above example, while the motors 60 are disposed inside the transparent mechanical reels 51a to 51e, they may be placed outside the transparent mechanical reels 51a to 51e. In this case, the geared reels provided at the ends of the reel surfaces of the transparent mechanical reels 51a to 51e are opposite to those in FIG. 4, and the gears (the mountain shape of the gear facing in the direction opposite to the center) are set on the outer diameter side and mesh with the motor gears 61a to 61e, causing the transparent mechanical reels 51a to 51e to spin.

The reel spinning auxiliary bodies 7 are members for fixing the transparent mechanical reels 51 in a fixed position without interrupting the spinning of the transparent mechanical reels 51, and in the present embodiment, the reel spinning auxiliary body 7A is provided at the upper front portion of the display 20, the reel spinning auxiliary body 7C is provided at a position on the opposite side of the motor 60 across the transparent mechanical reels 51 at the lower rear part of the display 20 and a reel spinning auxiliary body 7B is provided at the rear of the display 20. In this example, the reel spinning auxiliary bodies 7 fix the transparent mechanical reels 51 with three members, but it may be fixed with more numbers of members. In the case of three members, it is desirable that each of the reel spinning auxiliary bodies 7 can be disposed at a position of 120 degree angle from the center of the transparent mechanical reels 51. That is, the reel spinning auxiliary bodies 7 are provided on the outer peripheral side of the transparent mechanical reels 51 and fix the rotational position of the transparent mechanical reels 51, causing the transparent mechanical reels 51 to spin to a fixed position.

The reel spinning auxiliary body 7A is composed of a reel spinning auxiliary body fixture 7AA to be fixed to the side surface fixing plate 4a and the side surface fixing plate 4b, a reel spinning auxiliary body 7A1 fixed to the side surface fixing plate 4a and the side surface fixing plate 4b and the reel spinning auxiliary body 7A2. The reel spinning auxiliary body 7A1 may be provided with reel spinning auxiliary gears 7A1a to 7A1e for assisting the spinning of each of the transparent mechanical reels 51a to 51e. Here, the reel spinning auxiliary body 7A2 may also be provided with a reel spinning auxiliary gear for assisting the rotation of each of the transparent mechanical reels 51a to 51e. The reel spinning auxiliary gears 7A1a to 7A1e and 7A2a to 7A2e (not shown) come in contact with the outer diameter of the geared reel frames 511a to 511e to assist spinning.

Like the reel spinning auxiliary body 7A, the reel spinning auxiliary body 7B is composed of a reel spinning auxiliary body fixture 7BB fixed with the side surface fixing plate 4a and the side surface fixing plate 4b, a reel spinning auxiliary body 7B1 fixed with the side surface fixing plate 4a and the side surface fixing plate 4b as well, and the reel spinning auxiliary body 7B2. The reel spinning auxiliary body 7B1 may be provided with the reel spinning auxiliary gears 7B1a to 7B1e (not shown) for assisting the rotation of each of the transparent mechanical reels 51a to 51e. The reel rotation auxiliary gears 7B1a to 7B1e may be arranged as necessary. The reel spinning auxiliary gears 7B1a to 7B1e (not shown) and 7B2a to 7B2e (not shown) come into contact with the outer diameters of the geared reel frames 511a to 511e to assist rotation.

Like the reel spinning auxiliary bodies 7A and 7B, the reel spinning auxiliary body 7C is composed of a reel spinning auxiliary body fixture 7CC fixed with the side surface fixing plate 4a and the side surface fixing plate 4b, the reel spinning auxiliary body 7C1 fixed with the side fixing plate 4a and the side fixing plate 4b as well and the reel spinning auxiliary body 7C2. The reel spinning auxiliary body 7C1 may be provided with the reel spinning auxiliary gears 7C1a to 7C1e for assisting the rotation of each of the transparent mechanical reels 51a to 51e. The reel spinning auxiliary body 7C2 in FIG. 3 may be arranged as necessary. The reel spinning auxiliary gears 7C1a to 7C1e (not shown) and 7C2a to 7AC2 (not shown) come into contact with the outer diameter of the geared reel frames 511a to 511e to assist rotation.

Figure 6:
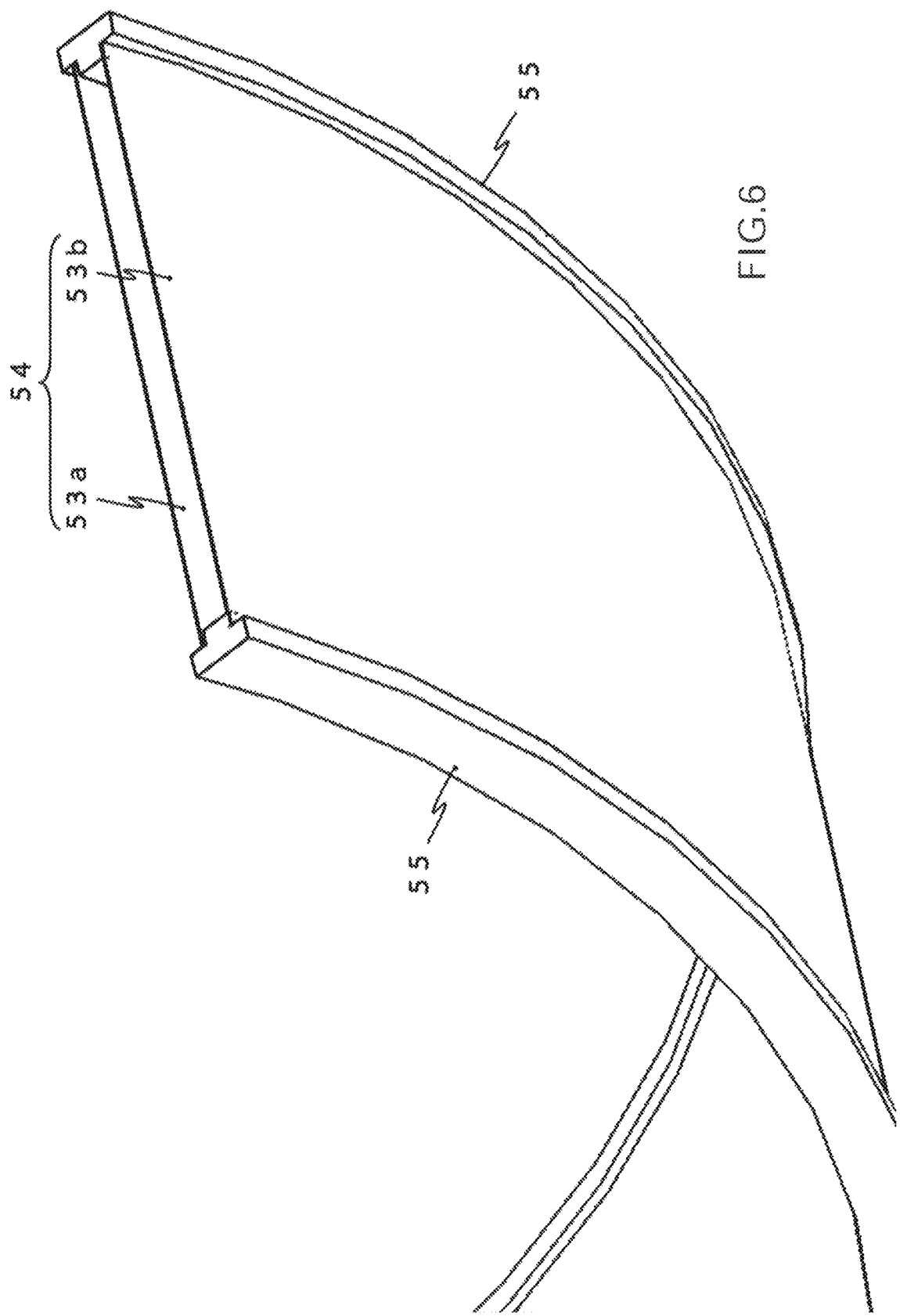
FIG. 6 is a cross-sectional view of a reel strip 54 of a transparent mechanical reel 51 sectioned in the horizontal direction in accordance with a first embodiment of the present invention.

FIG. 6 is a cross-sectional view of the reel strip 54 sectioned in the horizontal direction. The reel strips 54 engage with the geared reel frames 511 of the transparent mechanical reels 51 to form a transparent mechanical reel 51. The reel strips 54 is composed of a first layer reel strip 53b partially or entirely consisting of a transparent material, a second layer reel strip 53a located inside from the center of the first layer reel strip 53b, and a rim 55 for connecting the first layer reel strip 53b and the second layer reel strip 53a with a predetermined distance. This enables a player to visually recognize symbols in three dimensions as a whole by placing a predetermined symbol on the first layer reel strip 53b and arranging another symbol corresponding to the predetermined symbol on the second layer reel strip 53a which is located immediately under the predetermined symbol placed on the first layer reel strip 53b. For example, by placing a symbol of dinosaur on the first layer reel strip 53b and placing a background of the volcano on the second layer reel strip 53a immediately under the dinosaur symbol, it is possible for a player to recognize the symbols as if the dinosaur rises up from the volcano.

Here, while FIG. 6 illustrates the case where the reel strip 54 has two layers, it may be a plurality of layers of three or more layers. In this case, it is desirable that some or all of the surface of the reel strip 54 other than the innermost reel strip are transparent. That is, if there are three layers, some or all of the surface of the reel strip of the intermediate layer is transparent.

Figure 7:
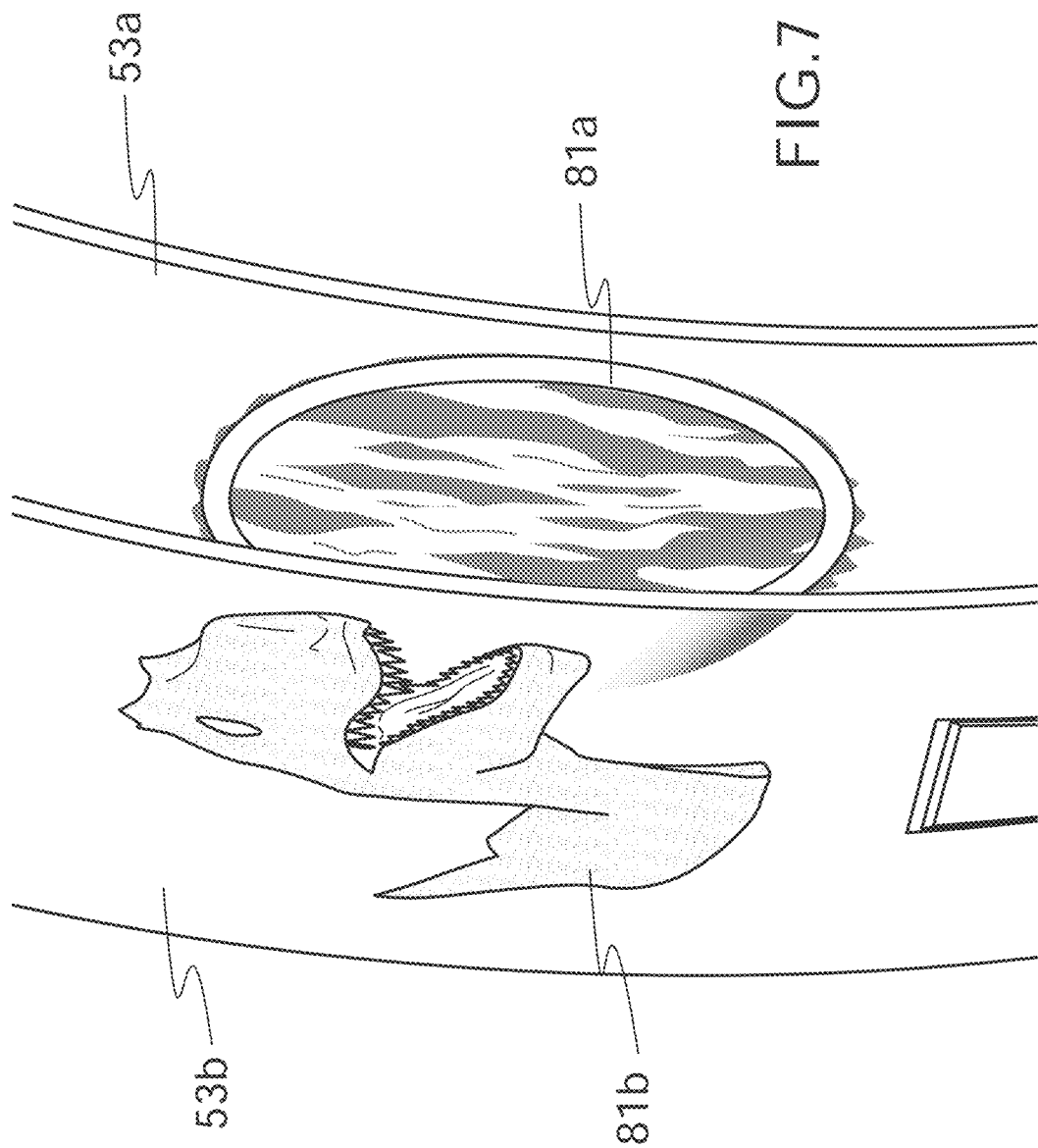
FIG. 7 is a perspective view for explaining a two-layer structure of a reel strip 54 in accordance with a first embodiment of the present invention.
Figure 8:
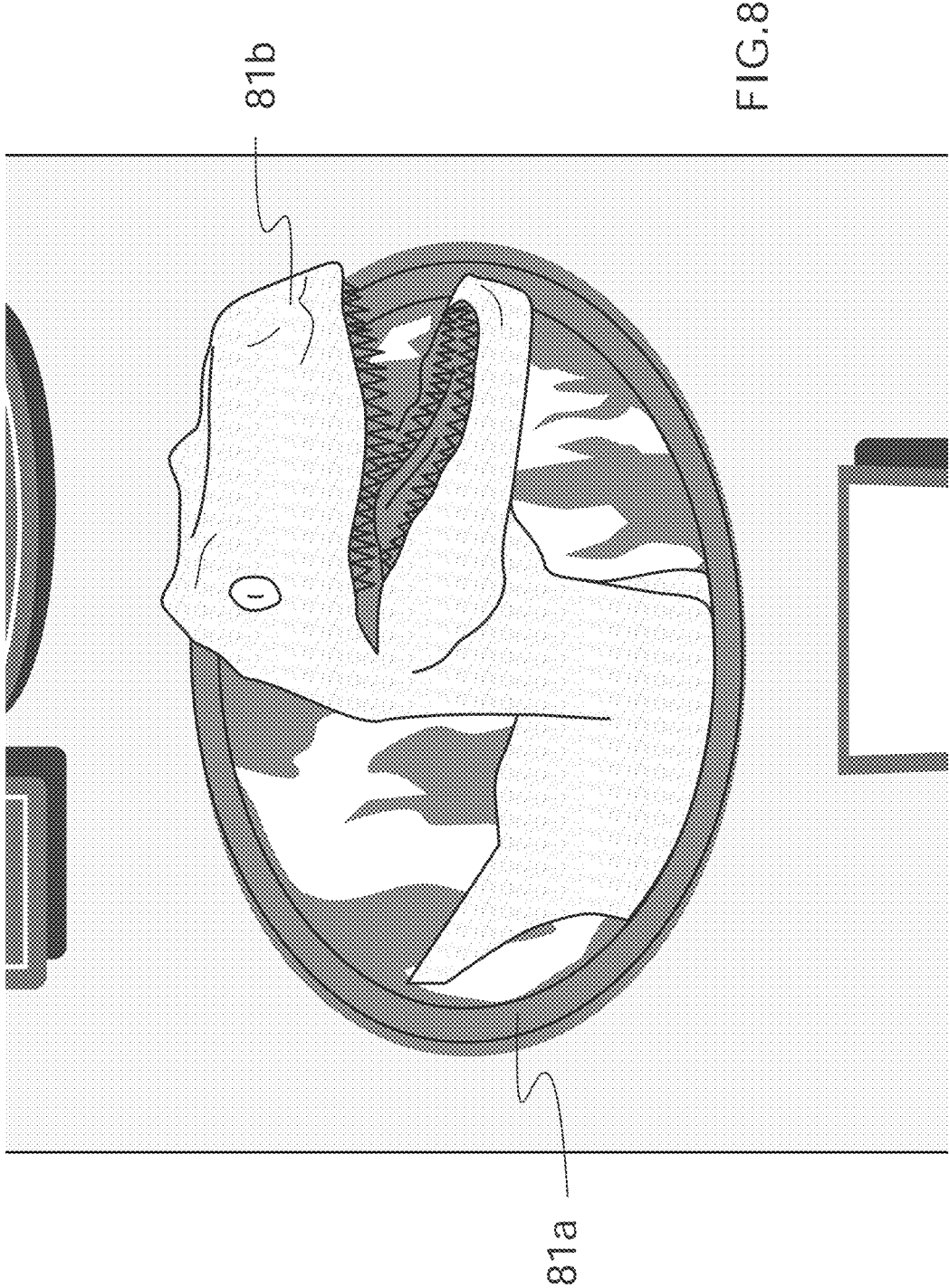
FIG. 8 shows symbols as viewed from a player side for explaining a two-layer structure of a reel strip 54 in accordance with a first embodiment of the present invention.

FIG. 7 is a schematic view illustrating a state in which the two-layer reel strip 54 of the transparent mechanical reels 51 is viewed from an oblique direction. The symbol of DINO 1 (foreground) 81b is arranged on the first layer reel strip 53b, and the symbol of DINO 1 (background) 81a is arranged on the second layer reel strip 53a. When seen from the viewpoint of a player, DINO 1 (foreground) 81b is positioned in front of DINO 1 (background) 81*a* as shown in FIG. 8, resulting that DINO 1 (foreground) 81*b* appears to float out.

Figure 9:
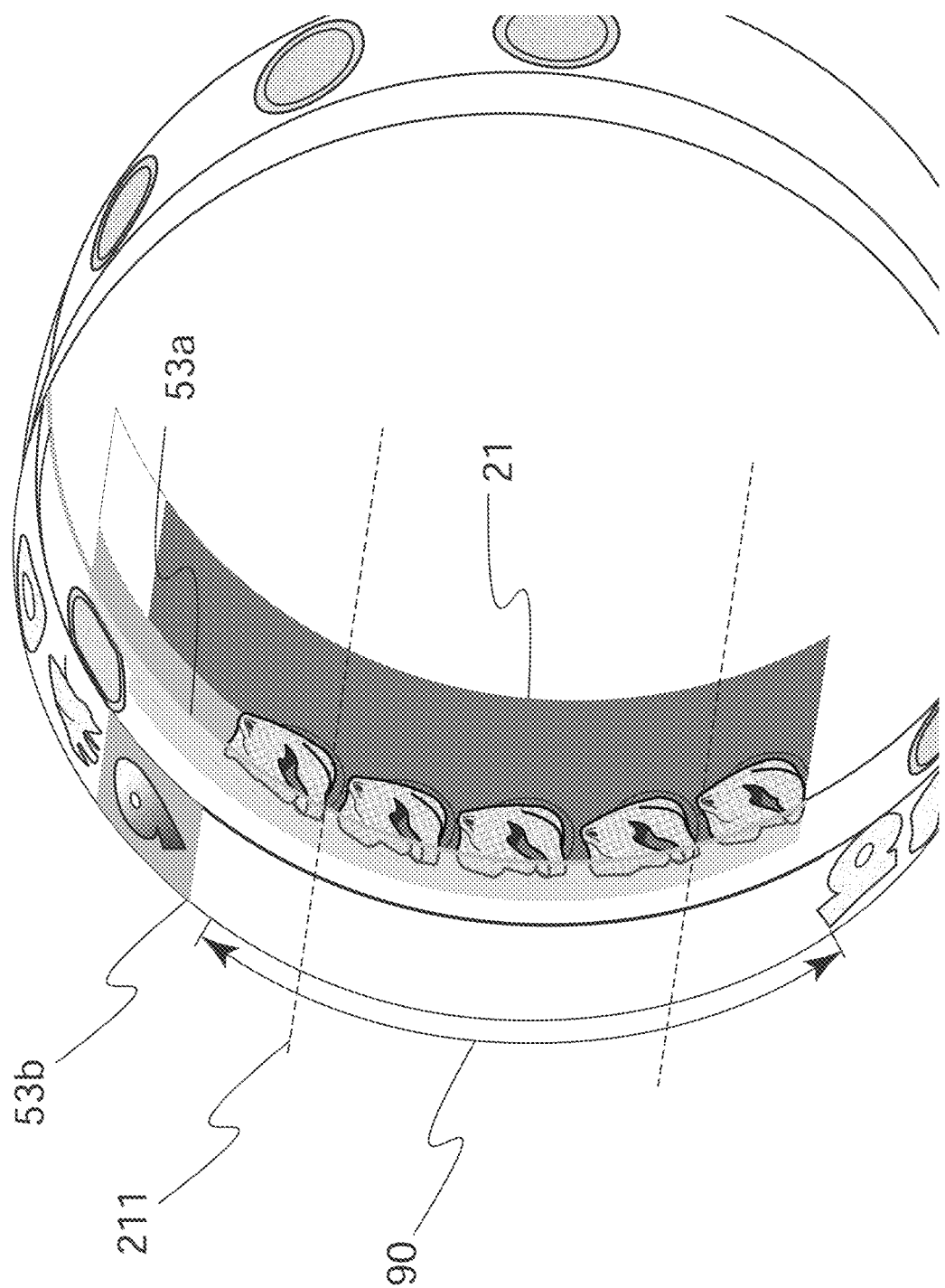
FIG. 9 is a perspective view for explaining a transparent portion with no symbol in accordance with the first embodiment of the present invention.

FIG. 9 is a schematic view for explaining a combination of symbols of two layer reel strips of one transparent mechanical reel 51*a* and symbols of a video reel shown on the display 20. A normal symbol (9 or 10) and a symbol composed of the combination of foreground and background are arranged on the first layer reel strip 53*b* and the second layer reel strip 53*a* of the transparent mechanical reel 51*a* respectively. And, in this case, at the symbol display area 111, a non-symbol transparent portion 90 (5 frames) in which no symbol is arranged at all on the transparent mechanical reel 51*a* is displayed. In this case, for example, symbols (DINO 1) of three frames are displayed in the image display area 21.

FIG. 10 shows the symbol rows arranged in each of the five transparent mechanical reels 51*a* to 51*e*. In these symbol rows, a plurality of symbols are uniformly arranged with predetermined distance. These symbol rows are physically arranged on the above-mentioned reel strip 54, and in the example of FIG. 10, they are composed of 24 symbols. Here, the frames of positions 1 to 5 have no symbol and are in a transparent state with no symbol. These five frames are constituted as non-symbol transparent portion. The non-symbol transparent portion allows a player to visually recognize the screen of the rear display 20 in a transparent state without causing the player to view any symbol. Furthermore, as will be described later, this non-symbol transparent portion rotates and displays the symbol of the video reel on the display 20 synchronized with the non-symbol transparent portion, and it is possible to provide a game causing as if the symbol rows of the transparent mechanical reels 51*a* to 51*e* are changed and the number of symbols of the symbol rows are increased (24 to 96, etc.).

In the example of FIG. 10, while the non-symbol transparent portion is composed of 5 frames, the number of frames may be the number of frames that vertical frames (in this example, 3 frames) of the symbol matrix (in this example, 5 horizontal frames, 3 vertical frames) plus one frame (in this example, a total of five frames) up and down. Details are described later.

[Circuit Configuration]

Figure 11:
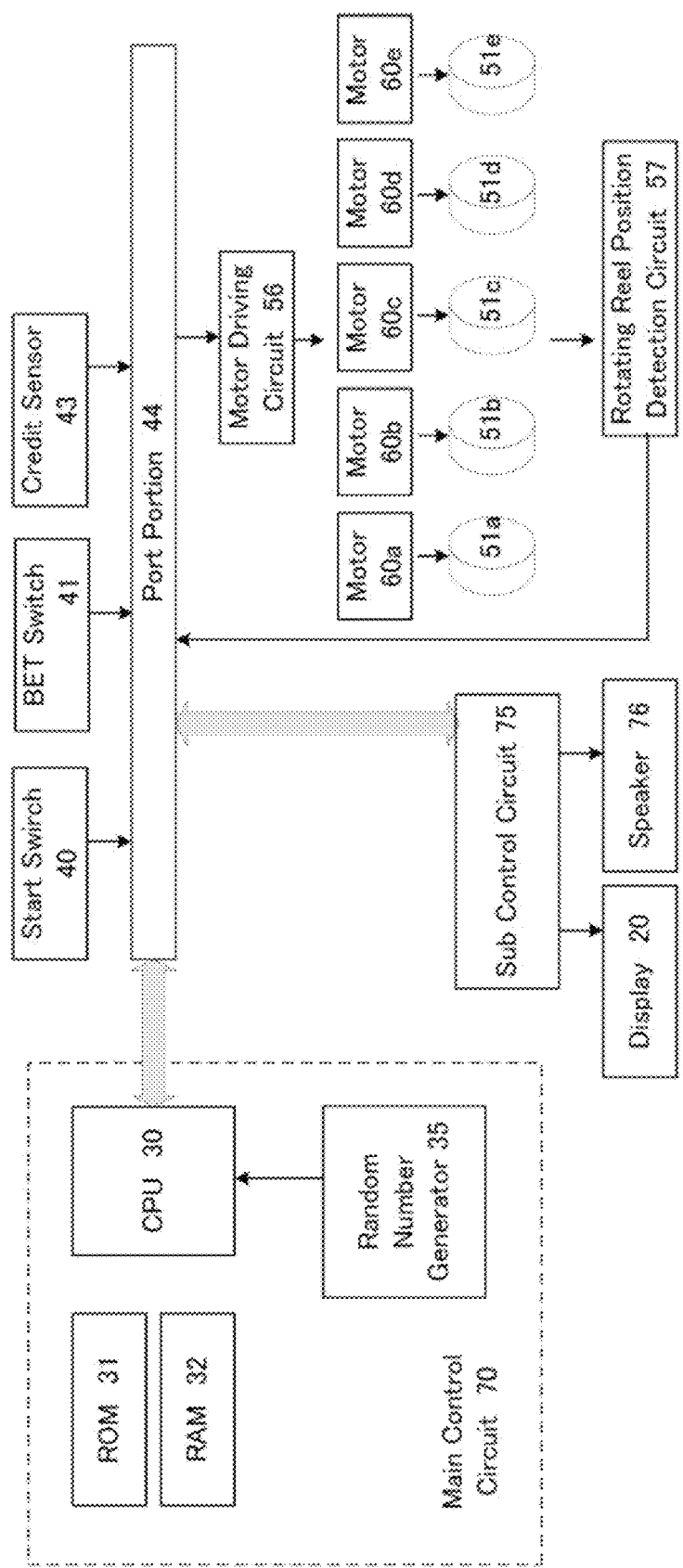
FIG. 11 is a circuit block diagram of a gaming machine 1 in accordance with a first embodiment of the present invention.

FIG. 11 is a diagram showing a circuit configuration including a main control board 70 for controlling game processing in the gaming machine 1, a sub control board 75 controlled from the main control board 70, and other peripheral devices. The main control board 70 is connected to the sub control board 75 and other peripheral devices via the port portion 44. The sub control board 75 controls the display 20 and the speaker 76 for outputs based on the control command and the notification signal transmitted from the main control board 70. The main control board 70 is configured by a computer disposed on a circuit board as a main constituent element in addition to a random number generator 35 for generating a random number. This computer includes a CPU 30 which reads a preset program and performs control operation and arithmetic processing, a ROM (Read Only Memory) 31 and a RAM (Random Access Memory) 32 which are data storage means. In either or both of the ROM 31 and the RAM 32, a plurality of winning symbol combinations that determine winning of the game is stored. In the following description, the gaming machine 1 is described as having a sub control board 75, but the gaming machine 1 does not have the sub control board 75 and the main control board 70 may performs all of controls and functions of the sub control board 75.

In the ROM 31 of the computer, a table used for determination of random number sampling performed each time the start switch 40 is operated, various control commands for transmitting to the sub control board 75 and the like are stored. In the electric circuit shown in FIG. 11, as the main peripheral devices of which operations are controlled by control commands from the computer, there are motors 60*a* to 60*e*, etc. rotationally driving the transparent mechanical reels 51*a* to 51*e*, in addition to the start switch 40, BET switch 41 and credit sensor 43.

Further, a motor driving circuit 56 for controlling the driving of motors 60*a* to 60*e* is connected to the output portion of the CPU 30. These driving circuits receive control signals such as drive commands output from the CPU 30 respectively and control the operation of each peripheral device.

The start switch 40 receives a start operation from a player and generates a start signal instructing the start of the game by operation thereof, and transmits a start signal to the random number generator 35 and the CPU 30. The credit sensor 43 detects credits such as prepaid cards, credit cards, medals and the like inserted into the credit storage unit 42. The rotating reel position detection circuit 57 receives a pulse signal from the reel rotation sensor and transmits a signal for detecting the rotational position of each of the transparent mechanical reels 51*a* to 51*e* to the CPU 30. The random number generator 35 generates random numbers within a certain range in accordance with the operation of the start switch 40, and the CPU 30 determines symbols to be stopped and displayed based on a table or the like stored in the ROM 31. It should be noted that the random number generator 35 may generate a random number value by executing the lottery program stored in the RAM 32, that is, the random number is generated by software.

After commencement of spinning of the transparent mechanical reels 51*a* to 51*e*, the number of pulses supplied to each of the motors 60*a* to 60*e* is counted, and the counted value is written in a predetermined area of the RAM 32. Reset pulses are obtained from the transparent mechanical reels 51*a* to 51*e* at every spin, and these pulses are entered into the CPU 30 via the rotating reel position detection circuit 57. A symbol arrangement table is stored in the ROM 31 in order to associate the spinning positions of the transparent mechanical reels 51*a* to 51*e* with the symbols drawn on the outer circumferential surface of the reel as described above. In this symbol table, as reference to the spinning position at which the aforementioned reset pulse is generated, a code number given every constant spinning pitch of each of the transparent mechanical reels 51*a* to 51*e*, a symbol position code provided corresponding to each code number and the symbol row are associated with each other. The motors 60*a* to 60*e* cause the transparent mechanical reels 51*a* to 51*e* to spin a predetermined number of times, and then to stop the spinning. If the transparent mechanical reels 51*a* to 51*e* stop with indication of winning, the CPU 30 transmits the credit payout instruction signal and stores credits added to the RAM 32.

[Basic Flowchart]

Figure 12:
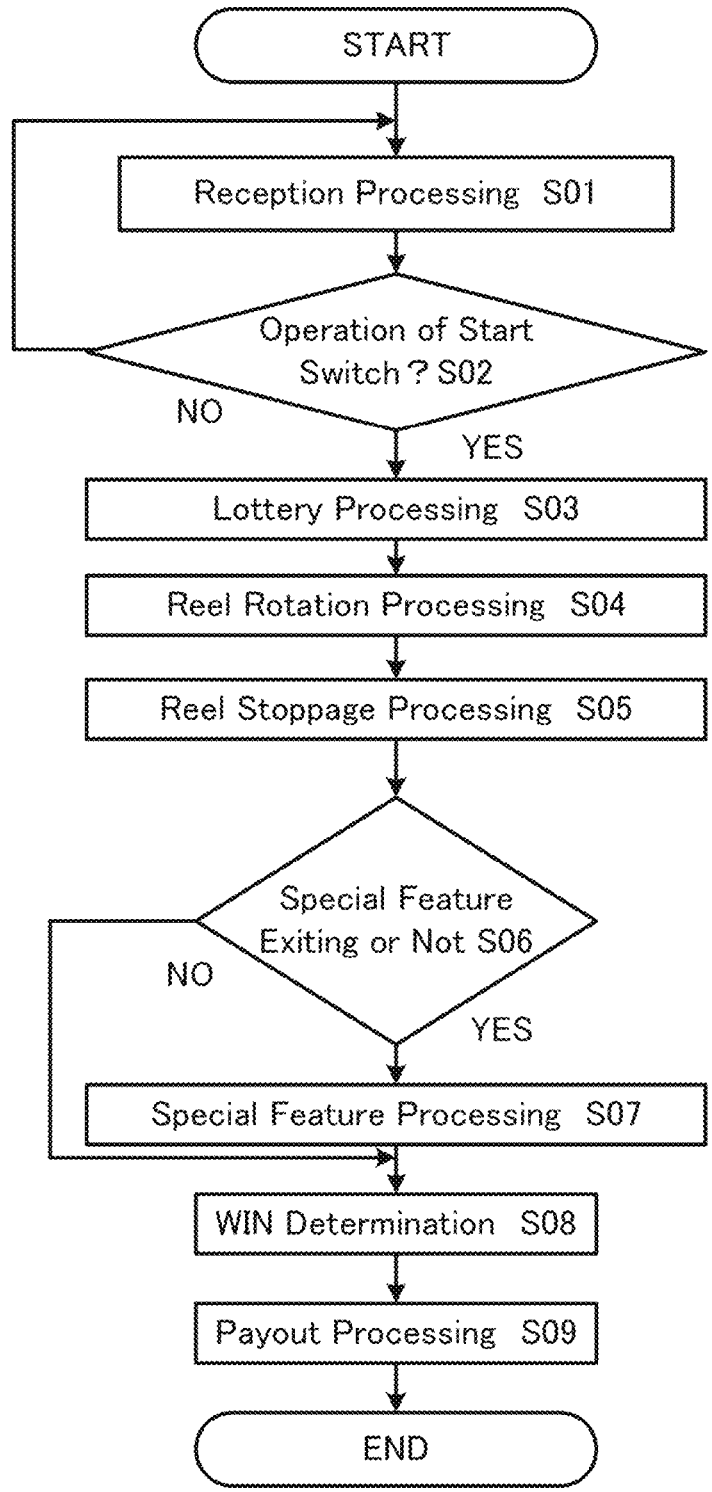
FIG. 12 is a basic flowchart executed by a CPU 30 of the gaming machine 1 in accordance with the first embodiment of the present invention.

FIG. 12 is a basic flowchart of a program read and executed by the CPU 30 of the gaming machine 1. The program of the basic flowchart is stored in one or both of the ROM 31 and the RAM 32 and is a program for executing the basic slot machine game process.

First, the CPU 30 performs a start reception process of waiting for a player to operate the start switch 40 (Step S01). At this time, the start reception process accepts coin insertion and betting operation (designation of a line to bet) using the BET switch 41 from a player.

Next, the CPU 30 determines whether or not the start switch 40 has been pressed (Step S 02). This determination is conducted based on a start signal entered into the CPU 30 in response to depression of the start switch 40. Here, when the start switch is not pressed ("NO" in Step S02), the process returns to the start acceptance process (Step S01). As a result, operations such as number of betting and line correction, etc. may be allowed. On the other hand, when the start switch 40 is pressed ("YES" in Step S02: receipt of the start signal), the number of betting set based on the above betting operation is subtracted from the number of credits currently owned by the player, and stores it in the RAM 32 as betting information.

Then, the CPU 30 performs a lottery process (Step S03). Specifically, the random number generator 35 of the CPU 30 samples the random number value from the predetermined random value range, and determines the symbol to be stopped in the symbol display area 111 based on the sampled random number value and the table. That is, the spinning of each of the five transparent mechanical reels a to e is stopped, and the symbols to be stopped and displayed on the symbol display area 111 are determined. Further, the symbol row to be used in the game may be determined by the lottery process. In this example, while either of normal reel symbol row or jackpot symbol row are used (usage of either one of two or more symbol rows may be determined) for the symbol rows arranged on the transparent mechanical reels 51, this lottery process determines which rows are used.

The normal reel symbol rows are shown in FIG. 13A and FIG. 13B, and the number of the symbols is 96. Except for some symbols, for example "WILD" in position 13, "TRIGGER" in position 21, etc., each of the five reels has suitably different symbol rows. On the other hand, the symbol rows of positions 6 to 24, positions 30 to 48, positions 54 to 72 and positions 78 to 96 are constituted by exactly the same 19 symbol rows as long as they are reels of the same number. This is because the symbols (positions 6 to 24) shown on the transparent mechanical reel 51 described in FIG. 10 correspond to these positions. Namely, in the normal reel symbol row, the symbol "DINO 1" is placed as a video reel in positions 1 to 5 which are non-symbol transparent portion and the transparent mechanical reels 51 are rotated, and then the symbol "DINO 2" is arranged as a video reel in positions 25 to 29 and the transparent mechanical reels 51 are rotated (second lap). Further, the symbol "DINO 3" is placed as a video reel at positions 49 to 53 and the transparent mechanical reels 51 are rotated (third lap), and the symbol "DINO 4" is arranged as a video reel at positions 73 to 77 and the transparent mechanical reels 51 are rotated (4th lap). At this time, the transparent mechanical reels 51 and the video reel are rotated and displayed on the display 20 in synchronization, causing a player to view the symbols as if they are arranged and rotated at the non-symbol transparent portion. This makes it possible for the player to recognize a symbol row longer than the symbol row displayed on the transparent mechanical reels 51.

The reel symbol row in the jackpot is shown in FIG. 14A and FIG. 14B, and the number of symbols is 156. This means, like the reel symbol rows at normal times, the symbol rows of positions 21 to 39, positions 60 to 78, positions 99 to 117 and positions 138 to 156 are constituted by exactly the same 19 symbol rows as long as the reel is the same. This is because the symbols (positions 6 to 24) shown on the transparent mechanical reel 51 described in FIG. 10 correspond to these positions. All other portions, that is, the positions 1 to 20 are composed of all the same symbols "DINO 1", the positions 40 to 59 are composed of all the same symbols "DINO 3", the positions 79 to 98 are composed of all the same symbols "DINO 2" and positions 118 to 137 are composed of all the same symbols "DINO 4".

Returning to the explanation of FIG. 12, the CPU 30 performs rotation processing of the transparent mechanical reels 51 (Step S04). When the transparent mechanical reels 51 rotate, the symbols of the video reel displayed on the non-symbol transparent portion are simultaneously rotated and displayed, causing that the combination of the transparent mechanical reels 51 and the video reels to be rotated and displayed. Here, as the symbol rows to be rotated, either one of the normal reel symbol rows or the jackpot reel symbol rows is used according to the result of the internal lottery. The CPU 30 causes five transparent mechanical reels 51 to be rotated and displayed respectively on the symbol display area 111, and thereby the symbol rows spin at a predetermined speed. Thereafter, the CPU 30 determines an rendition pattern for a unit game, instructs the sub control board 75 or the like to start the rendition with the determined rendition pattern. Here, the unit game refers to a series of processes in which the spinning display of each of the transparent mechanical reels 51 are started and then all the transparent mechanical reels 51 are stopped. The sub control board 75 causes a predetermined image rendition (it may be an image rendition at the normal time, or if it has won the jackpot, it may be an image rendition such as a predictor) to be shown on the display 20.

FIG. 15 is a view for explaining the composite symbol synchronously indicating the symbol to be rotated and displayed on one transparent mechanical reel 51a and the symbol shown on the display 20. In FIG. 15, the transparent mechanical reel 51a and the composite reel of the video reel are located on top, the spinning display of the transparent mechanical reel 51a (same for b to e) is located in the middle and the video reel shown on the display is located below. A composite symbol is a symbol which a player actually visually recognizes. In this example, the symbol display area 111 is composed of three vertical frames and five horizontal frames. These three vertical frames are shown as upper, middle and lower rows, and furthermore, frames outside the display portion are shown at the top and bottom. Steps 1 to 15 in the figure show time series, wherein spinning starts from Step 1 and a symbol is shifted downward by one frame, transitioning time to Step 15.

Step 1: First, the transparent mechanical reel 51a indicates symbols at the upper row (T-REX: DINO 1), the middle row (J) and the lower row (Triceratops: DINO 2), and the video reel is blank and does not display anything. Therefore, the composite symbol comprises the upper row (DINO 1), the middle row (J) and the lower row (DINO 2).

Step 2: Next, a single frame symbol shifts downward by spinning, and the symbols of the transparent mechanical reel 51a is composed of the upper row (10), the middle row (DINO 1) and the lower row (J). Video reels are blank and do not display anything. Therefore, the composite symbol includes the upper row (10), the middle row (DINO 1) and the lower row (J).

Step 3: Further, when the reel is shifted by one frame, the transparent mechanical reel 51a rotates and displays the non-symbol transparent portion. Namely, it is the part "without symbol" of the upper row. At this time, by displaying (T-REX: DINO 1) on the upper row of the video reel, it is possible to display T-REX: DINO 1 on the upper row of the composite symbol. At this time, by preliminarily displaying T-REX: DINO 1 on the display 20 outside the frame above the upper row in Step 2, when transitioning to Step 3, the composite symbol DINO 1 can be rotated and displayed in synchronization with any strange feeling.

Step 4: Further, when the reel is shifted by one frame, the transparent mechanical reel 51*a* displays 2 non-symbol transparent portions. That is, the portion "without symbol" of the upper and middle rows becomes two frames. At this time, T-REX: DINO 1 can be displayed on the upper and middle rows of the composite symbol by displaying two frames of T-REX: DINO 1 on the upper and middle rows of the video reel.

Step 5: Further, when the reel is shifted by one frame, the transparent mechanical reel 51*a* displays 3 non-symbol transparent portions. That is, the portion "without symbol" on upper, middle an lower rows becomes three frames. At this time, T-REX: DINO 1 can be displayed on the upper, middle and lower rows of the composite symbols by displaying T-REX: DINO 1 on the upper, middle and lower rows of the video reel in three frames.

Step 6to 10: At these steps, the transparent mechanical reel 51 *a* is stopped. As shown in FIG. 13A and FIG. 13B, since five frames DINO 1 are continuous in the normal reel symbol row, when the transparent mechanical reel 51*a* spins at this time, it is impossible to rotate and display five frames of DINO 1. Therefore, the transparent mechanical reel 51*a* is temporarily stopped.

Step 11 and 12: With the spinning of DINO 1 of 5 vertical frames, when the transparent mechanical reel 51*a* rotates synchronously at the timing when the outside of the upper frame of the upper row becomes empty, the upper row "9" is rotated and displayed out of the frame, and "9" is displayed on the upper row of the transparent mechanical reel 51*a* in Step 12, and the upper row "9", the middle row "DINO 1" and the lower row "DINO 1" are displayed as composite symbols.

Step 13 to 15: Thereafter, when the transparent mechanical reel 51*a* is rotated and displayed every one frame at a time, the symbol of the video reel transitions from "DINO 1" to the white one frame at a time.

In the above description, the case where the transparent mechanical reel 51*a* is temporarily stopped is explained by "DINO 1" (positions 1 to 5), but even in the cases of DINO 2 to 4 (positions 25 to 29 etc.), temporary stop and rotation are similarly performed.

Figure 17:
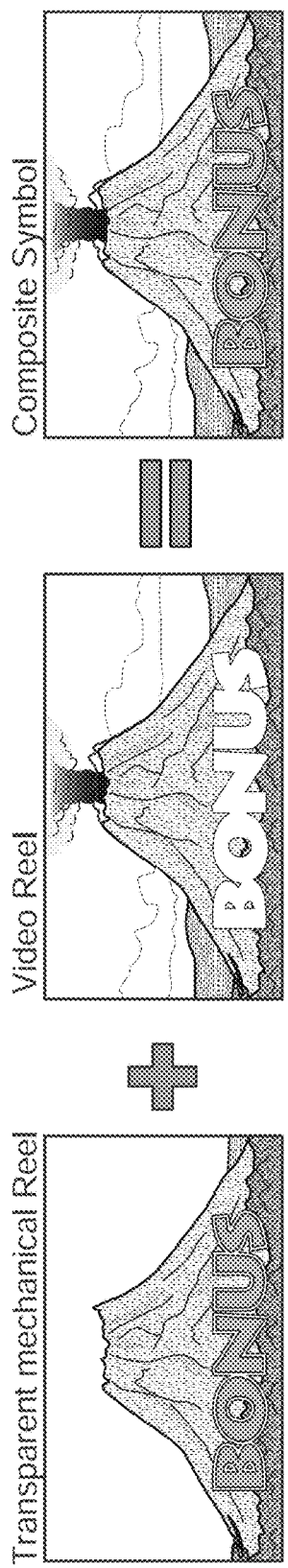
FIG. 17 is a conceptual diagram showing an example when BONUS symbols are synthesized in the first embodiment of the present invention.

It should be noted that one symbol on the transparent mechanical reel 51*a* and one symbol on the video reel may simply be synchronized to constitute one symbol and rotationally displayed. That is, as shown in FIG. 17, the BONUS symbol (volcano+character) on the transparent mechanical reel 51*a* and the video reel symbol (volcanic smoke+volcano+outlined characters) are synchronized and superimposed, which may be rotated in synchronization. In this case, since the symbol can be viewed three-dimensionally, it is possible for a player to be interested in this symbol, and rotation and display can be emphasized.

Figure 18:
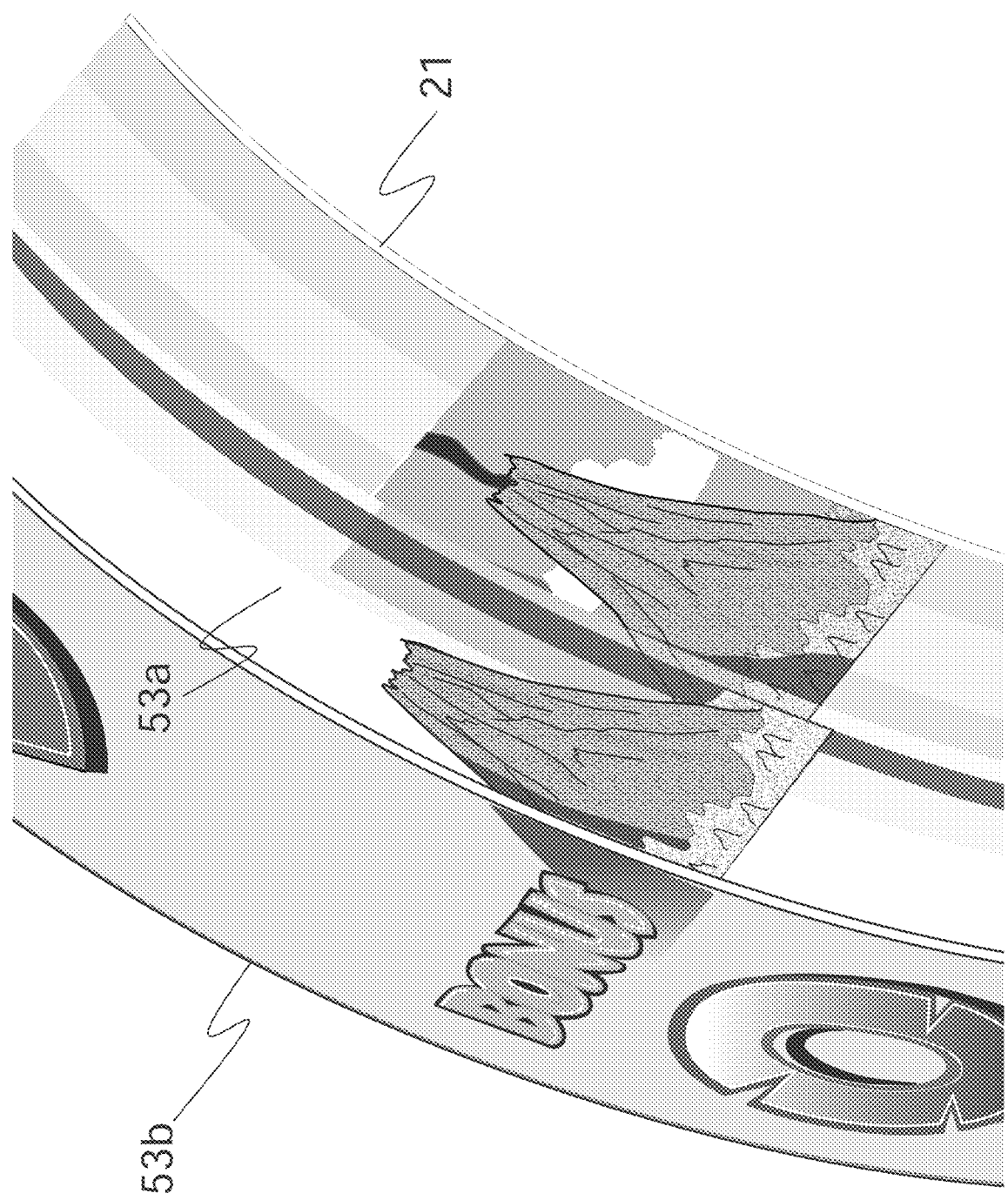
FIG. 18 is a schematic diagram showing the superimposition of the symbols (BONUS: perspective view) of the transparent mechanical reel 51 in accordance with the first embodiment of the present invention.
Figure 19:
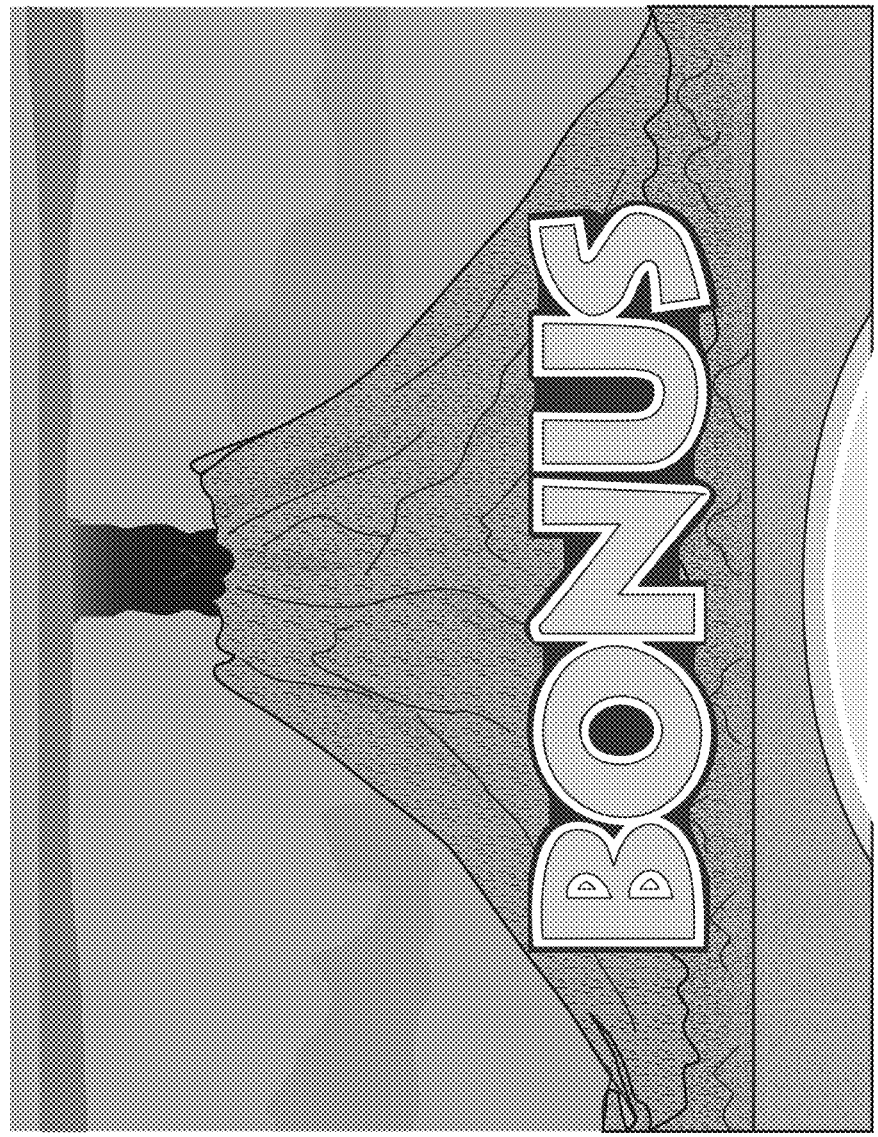
FIG. 19 is a schematic view showing the superimposition of the symbols (BONUS: front view) of the transparent mechanical reel 51 in accordance with the first embodiment of the present invention.

FIGS. 18 and 19 are diagrams for explaining overlapping of two layers of reel strips of one transparent mechanical reel 51*a* and symbols on a video reel shown on the display 20. By superposing the first layer reel strip 53*b*, the second layer reel strip 53*a* and the symbols displayed in the image display area 21 of the display 20 as shown in FIG. 18, three-dimensional symbols as shown in FIG. 19 are formed from the viewpoint of a player. In other words, the character of "BONUS" can be seen most closely, the volcano appears stereoscopically at the back, and at the rear thereof, the display showing the volcanic smoke can be displayed on the symbol display area 111.

Returning to FIG. 12, when a predetermined time has elapsed, the CPU 30 stops the spinning of the transparent mechanical reels 51 on the symbol display area 111 in a predetermined order (Step S05). The transparent mechanical reels 51 may be stopped in the manner that all 5 reels stop at the same time or with some time deviation, or after 5 reels have temporarily stopped, the reels are rotated again to slip one or more frames above or below (Nudge) in which the final symbol row is determined (slippage of the frame). In addition, if the transparent mechanical reels 51 are stopped and the symbol is determined and the non-symbol transparent portion 90 is stopped, the symbols stopped and displayed may be changed by the image without rotating the transparent mechanical reels 51 since the symbols of the video reel are displayed.

Next, the CPU 30 determines whether or not there is a special feature in the symbols stopped and displayed (Step S06). Here, the special feature is a symbol of a jackpot (DINO 1 to 4), a special winning symbol such as WILD, TRIGGER or the like. In this embodiment, the symbol to be stopped and displayed is a group of symbols consisting of 3 vertical frames and 5 horizontal frames, and hereinafter referred to as the symbol group stopped and displayed. If one or more predetermined symbols (the above-mentioned DINO 1 to 4, WILD, TRIGGER) are displayed somewhere in the symbol group stopped and displayed, the CPU 30 may judge that a special feature exists (scatter) or if a plurality of predetermined symbols are displayed horizontally or diagonally to form a line in the matrix, the CPU 30 may judge that a special feature exists.

Here, determination of whether or not there is a special feature of the jackpot (DINO 1 to DINO 4) may be performed by whether non-symbol transparent portions of all five transparent mechanical reels 51*a* to 51*e* are stopped in all of the symbol display area 111 consisting of three vertical frames.

Then, if the CPU 30 determines that there is a special feature in the symbols stopped and displayed (Step S06: "YES"), the CPU 30 moves the process to Step S07. If the CPU 30 determines that there is no special feature in the symbols stopped and displayed (Step S06: "NO"), the CPU 30 moves the process to Step S08.

Figure 16:
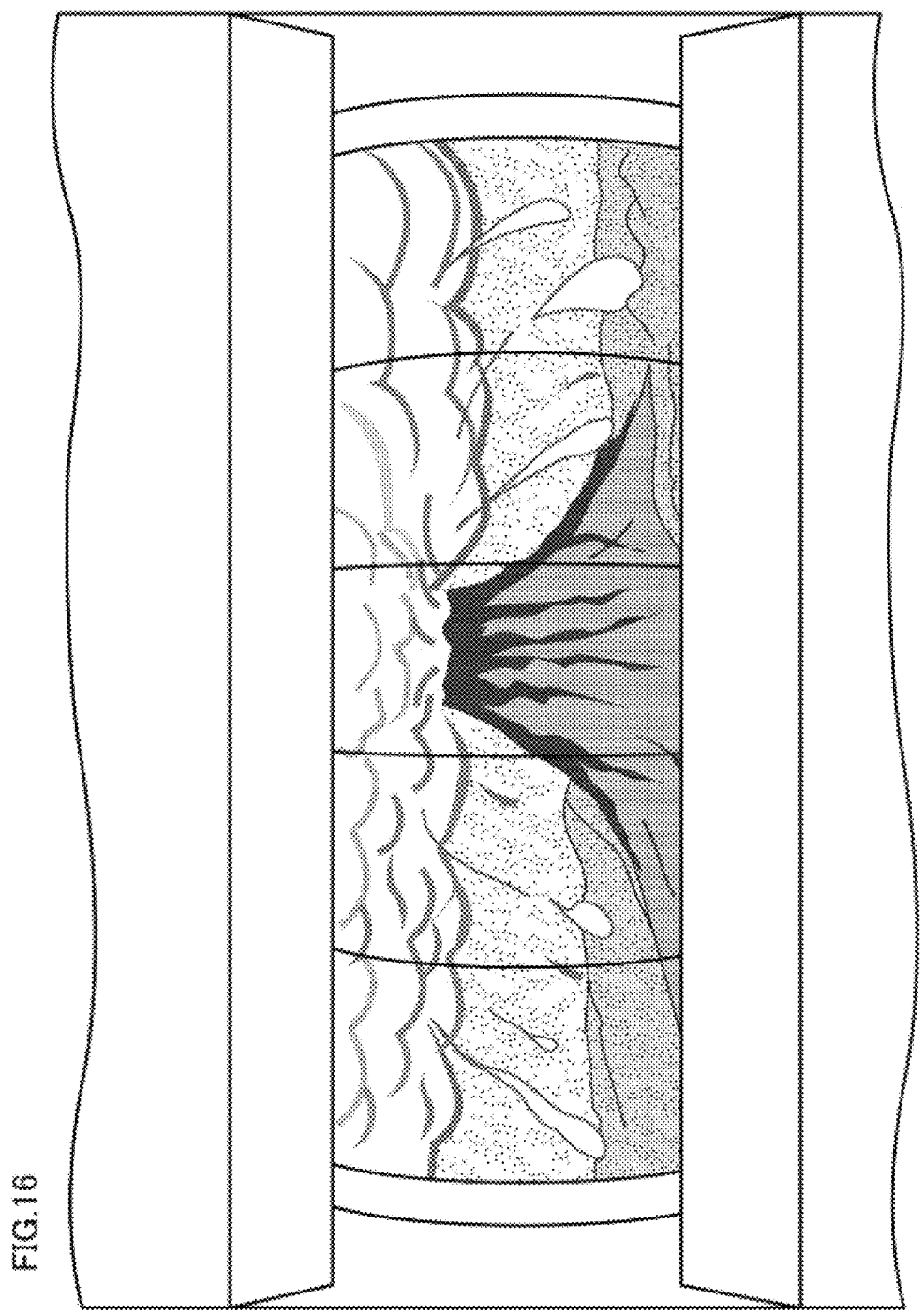
FIG. 16 shows an example of presentation showing all transparent portions without symbol on a symbol display portion 111 in accordance with the first embodiment of the present invention.

If it is determined that there is a special feature, the CPU 30 executes special feature processing (Step S07). One example of the special feature processing is rendition processing at the time of winning a jackpot. For example, as shown in FIG. 16, rendition image ((in this case, eruption of the volcano) indicating that the jackpot has been won on the display 20 by stopping the spinning, such that non-symbol transparent portion of all five transparent mechanical reels 51*a* to 51*e* is displayed on the symbol display are 111 (non-symbol transparent portions are displayed in vertical matrices of all three frames). Here, as shown in FIG. 16, the rendition may be provided such that non-symbol transparent portions of 4 or less of the transparent mechanical reels 51 are used, instead of using all 5 non-symbol transparent portions of the transparent mechanical reels 51*a* to 51*e*. Furthermore, the rendition may also be provided by using non-symbol transparent portions of 2 frames or less, instead of displaying the non-symbol transparent portions in all three frames in the vertical matrix. And then, the CPU 30 may execute the processing of spinning the transparent mechanical reels 51 without waiting for the start operation from a player after the display of the rendition image is completed.

Figure 20:
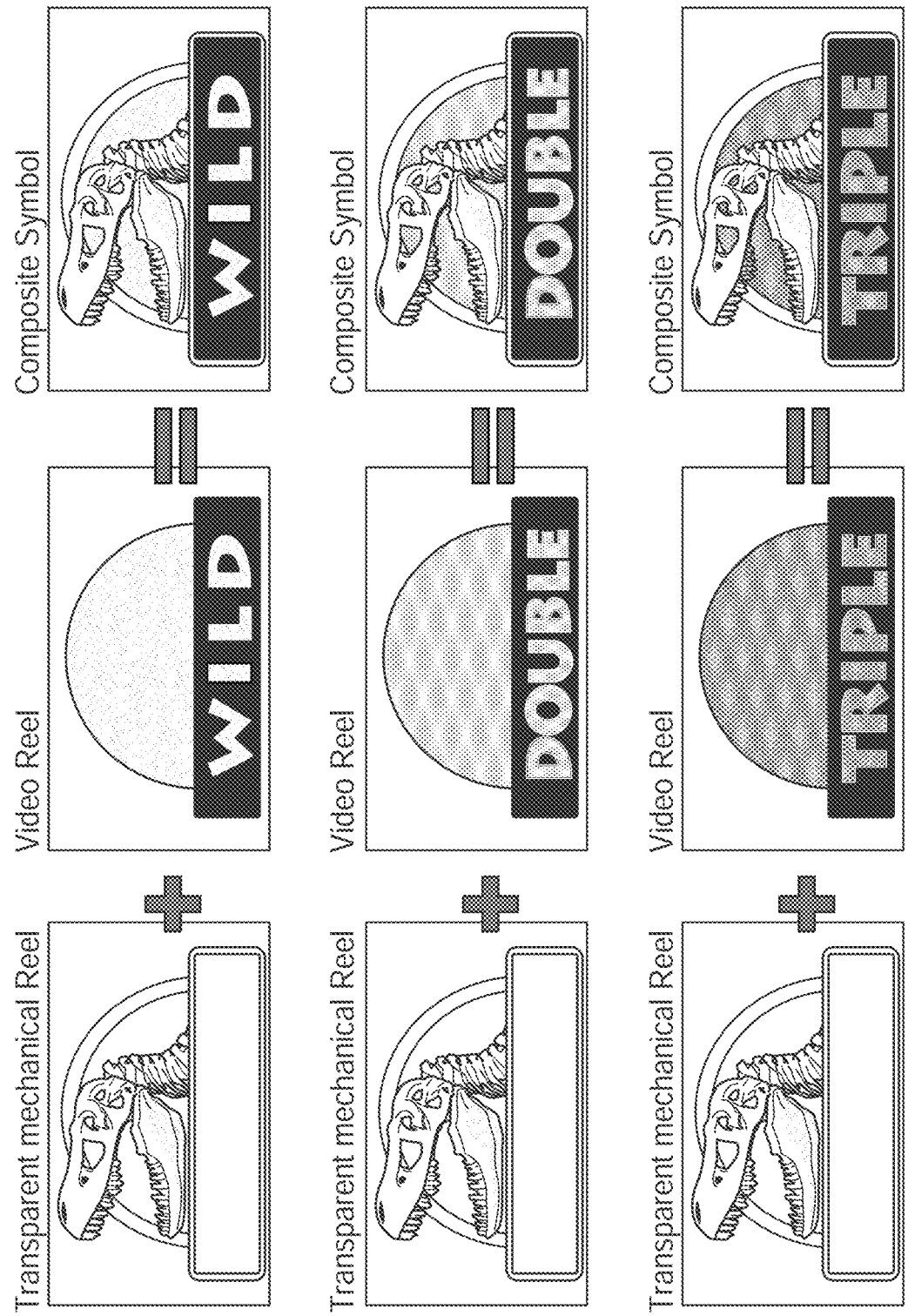
FIG. 20 is a conceptual diagram showing an example when WILD symbols are synthesized in accordance with the first embodiment of the present invention.
Figure 21:
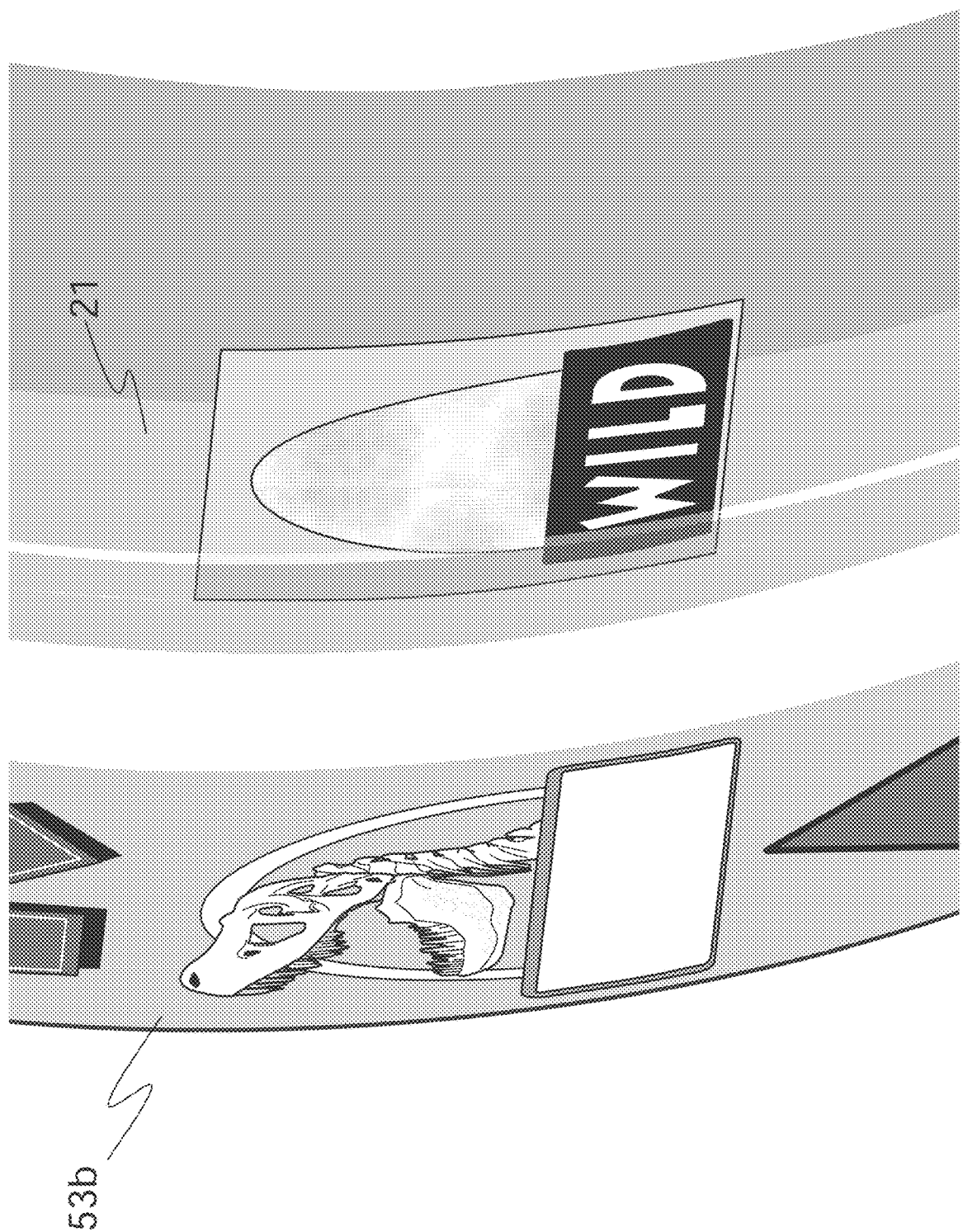
FIG. 21 is a schematic view showing the superimposition of the symbols (WILD: perspective view) of the transparent mechanical reel 51 in accordance with the first embodiment of the present invention.
Figure 22:
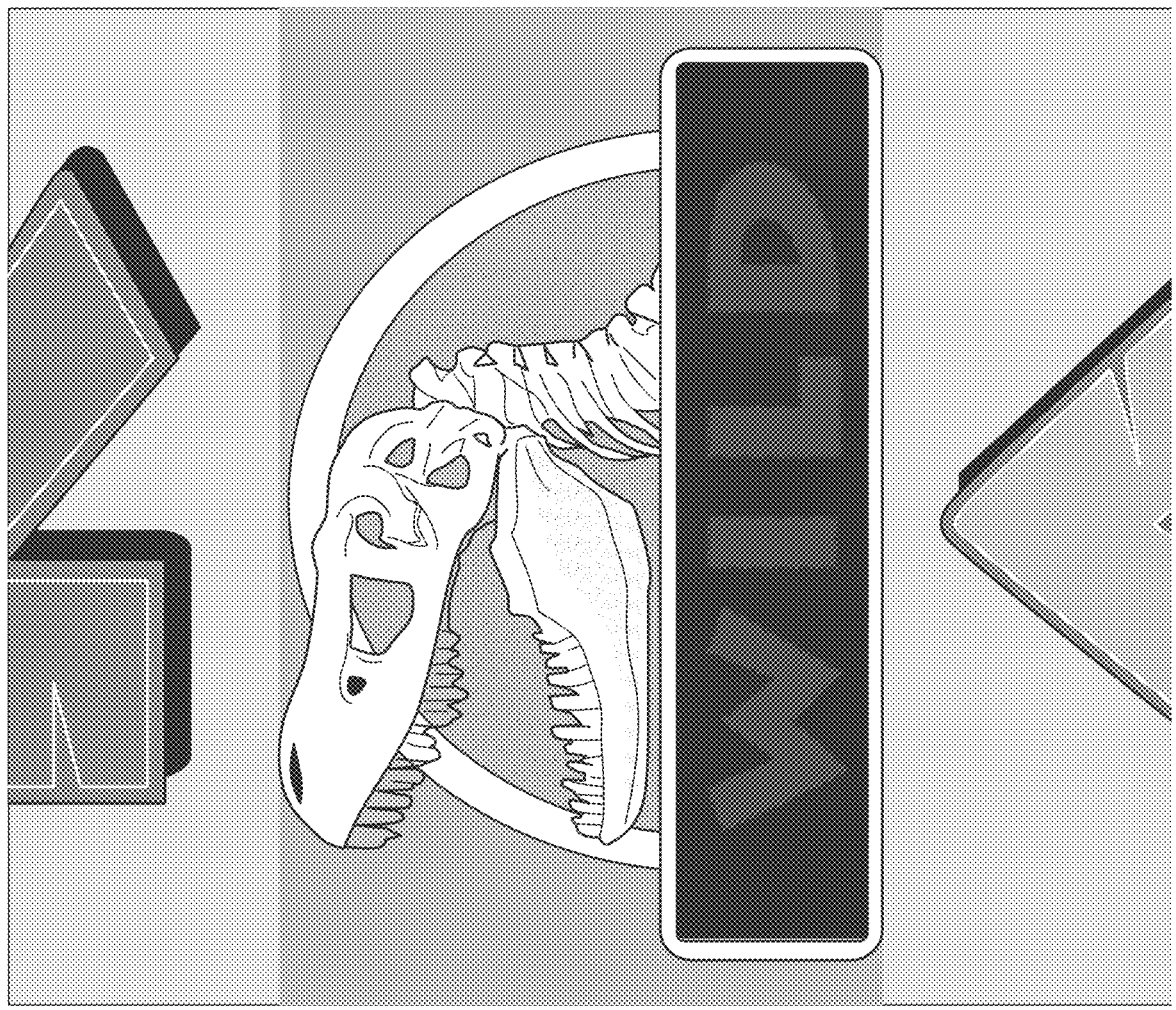
FIG. 22 is a schematic view showing the superimposition of the symbols (WILD: front view) of the transparent mechanical reel 51 in accordance with the first embodiment of the present invention.

Furthermore, as an example of the special feature processing, the rendition processing when winning the WILD is explained. "WILD" symbol is physically arranged in the symbol row of the transparent mechanical reels 51 as shown in FIG. 10, and as an example, the symbol of the transparent mechanical reels (bone of a dinosaur) shown in FIG. 20 is arranged. Here, the symbol of the video reel is either one of three kinds of "WILD", "DOUBLE" and "TRIPLE" and one composite symbol (winning symbol) is formed and displayed in combination with the symbol of the transparent mechanical reels (bone of a dinosaur).

Different winnings may be given depending on the type of the symbol of the video reel (double award if it is DOUBLE, triple the prize if it is TRIPLE). Here, after the five transparent mechanical reels 51 are temporarily stopped (after the WILD symbol "dinosaur bone" of the transparent mechanical reels 51 has stopped), only the symbol of the video reel may be changed again (for example, from WILD to DOUBLE).

Figure 23:
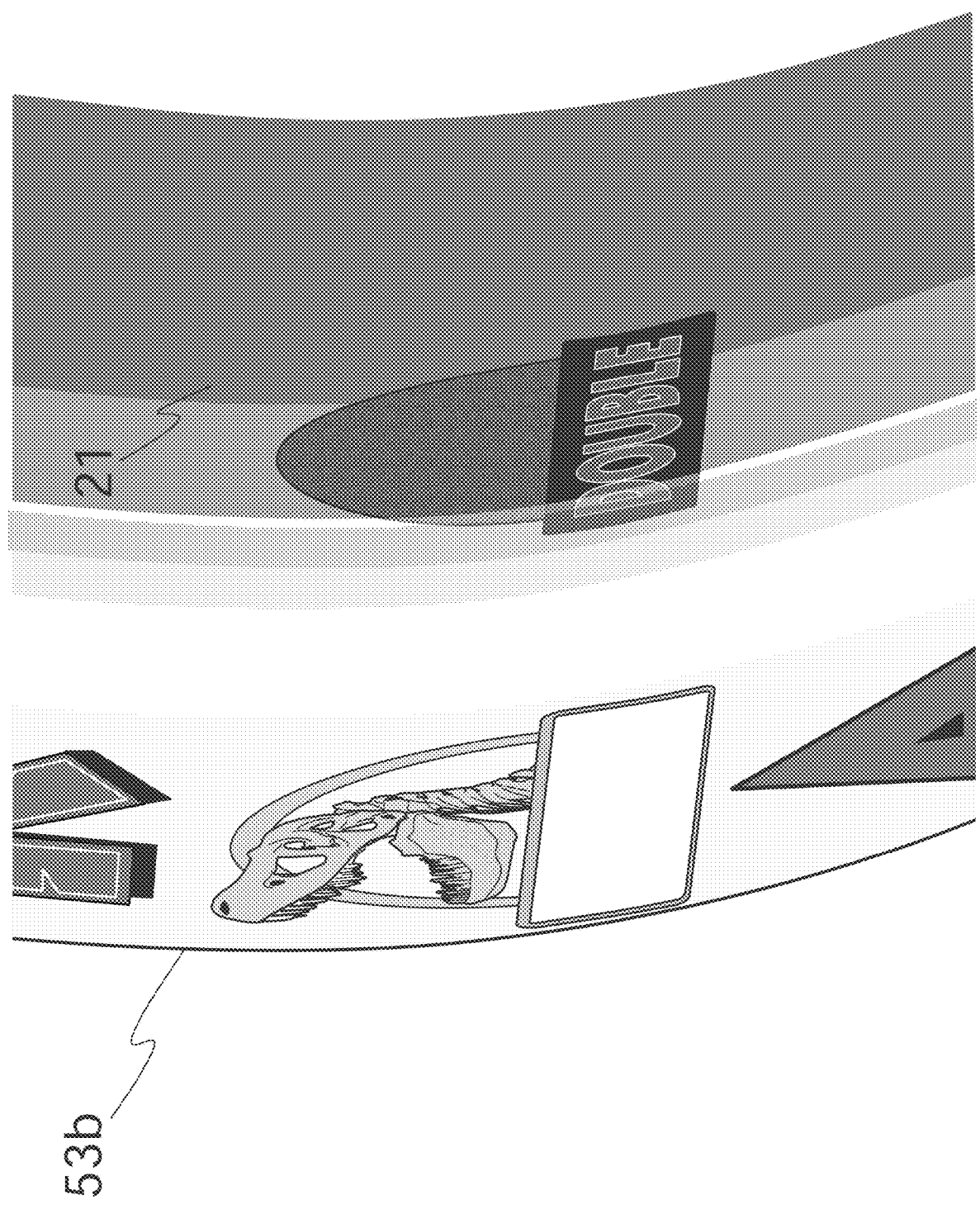
FIG. 23 is a schematic view showing the superimposition of the symbols (DOUBLE: perspective view) of the transparent mechanical reel 51 in accordance with the first embodiment of the present invention.
Figure 24:
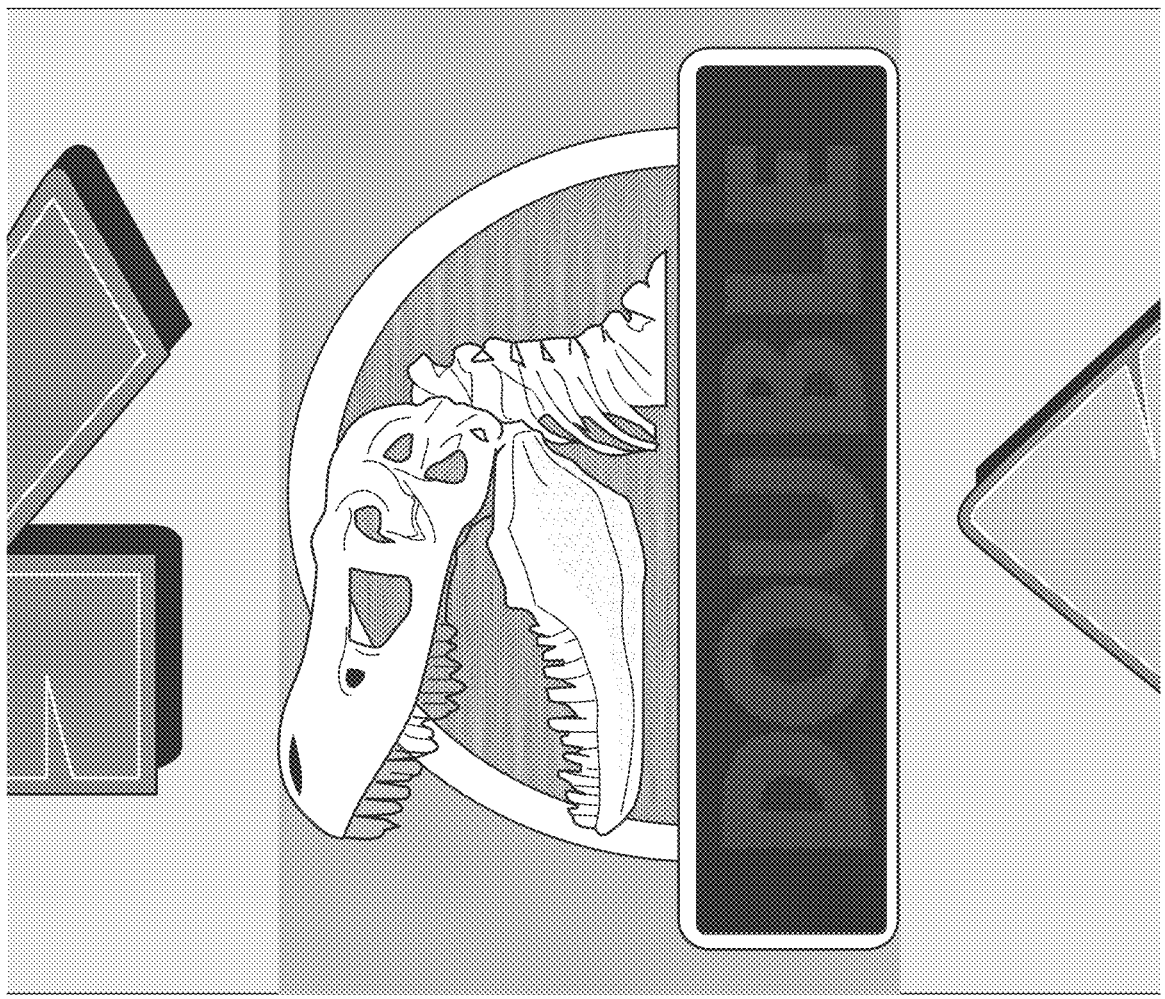
FIG. 24 is a schematic diagram showing the superimposition of the symbols (DOUBLE: front view) of the transparent mechanical reel 51 in accordance with the first embodiment of the present invention.

Changes in the symbol display in this case are shown in FIGS. 21, 22, 23, and 24. That is, the symbol of the video reel are stopped and displayed at "WILD"'s (FIG. 21 and FIG. 22) further rotates to be changed to the symbol "DOUBLE" (FIGS. 23 and 24). This can be realized by replacing only letters with video reels, since the pictures of the winning symbols are the same dinosaur bones and the symbols are distinguished only by letters.

Next, the CPU 30 performs a WIN determination as to whether the symbol displayed on the symbol display area 111 is a winning combination (Step S08). This determination is performed based on the position codes of the transparent mechanical reels 51*a* to 51*e* stored in the ROM 31 or the RAM 32 and the information of the symbols displayed on the video reels. The winning combination of symbols may be the same as that of a normal slot machine, which for example, is a case where the same symbols are arranged in a lateral or diagonal manner by more than a predetermined number (two to five). At this time, a winning determination may be made without distinguishing whether a winning combination of symbols are symbols disposed on the transparent mechanical reels 51 or symbols displayed on the video reel.

Then, in the WIN determination, if it is a winning combination of symbols, the CPU 30 transmits a credit payment instruction signal and pays out credits corresponding to winnings (Step S09). Here, credit addition processing may be performed as data in the RAM 32, or medals may be physically paid out by a predetermined apparatus.

[Second Embodiment]

The slot machine 2 according to the second embodiment will be described with reference to the drawings. The second embodiment is different from the gaming machine 1 according to a first embodiment in that the present invention is applied to a gaming machine in which a player can stop a reel by operating a stop switch, for example, a pachislot. In other words, the machine video reel unit 5 of the gaming machine 1 is an example applied to a pachislot machine with a stop switch or the like. Since the structure and control are the same as those of the gaming machine 1 according to a first embodiment except for the points described below, descriptions of overlapping parts are omitted.

Figure 25:
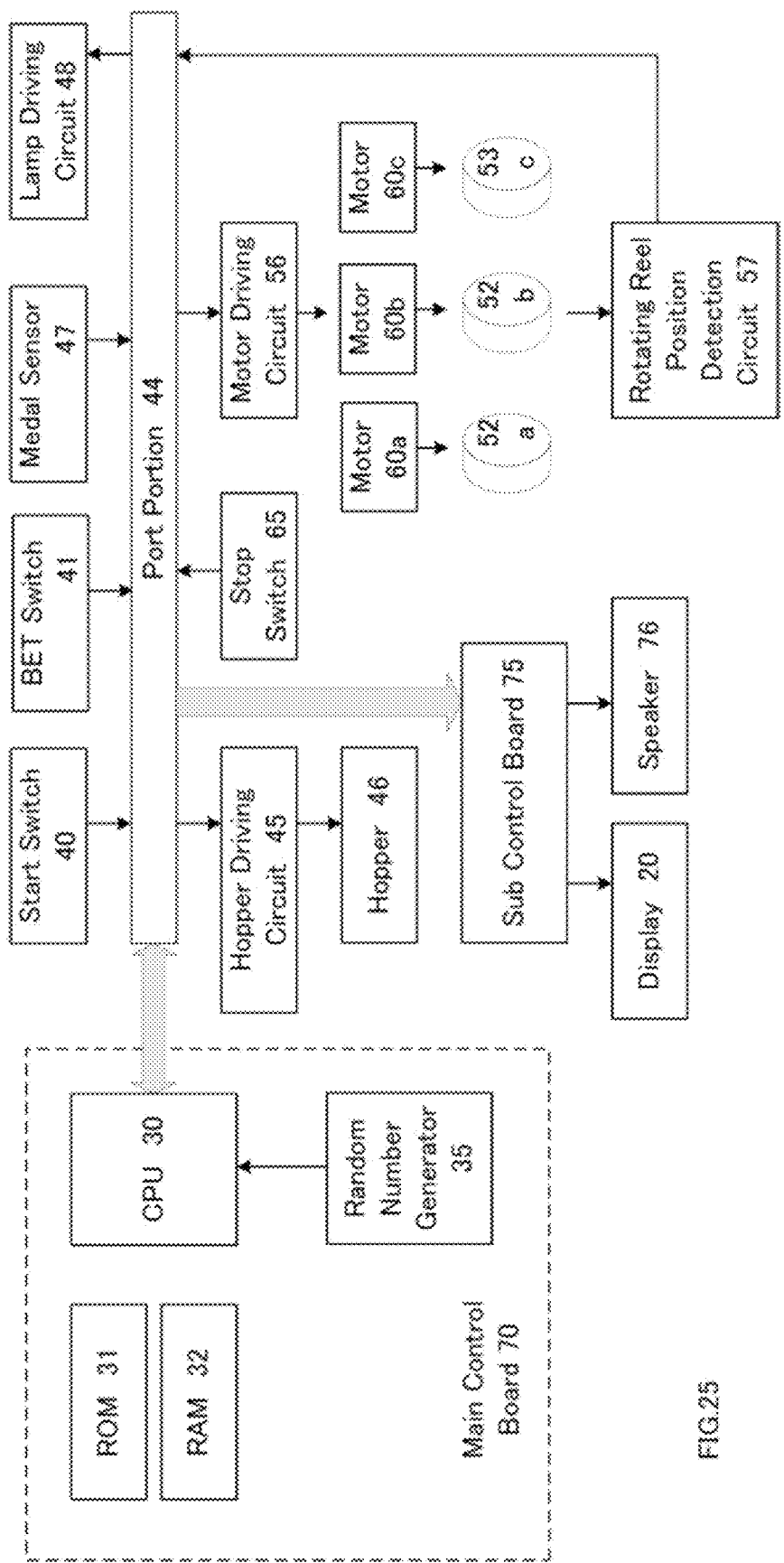
FIG. 25 is a circuit block diagram of the slot machine 2 in accordance with the second embodiment of the present invention.

FIG. 25 is a diagram showing a circuit configuration of the slot machine 2. Unlike the gaming machine 1, the slot machine 2 includes a hopper 46 for paying out medals according to winning, a hopper driving circuit 45 for driving and controlling the hopper 46, a medal sensor 47 for detecting insertion of medals, a winning lamp driving circuit 48 for driving the lamp in accordance with winning, and a stop switch (may be a button) 65 for stopping the transparent mechanical reels 52*a* to 52*c*. Since there may be three transparent mechanical reels 52, the stop switch 65 may be provided (left, middle, right) corresponding to each of the three reels.

Here, the sub control board 75 does not transmit commands or data to the main control board 70, and communication may be performed in one direction from the main control board 70 to the sub control board 75. In the ROM 31, an internal lottery table used for determination of random number sampling performed each time the start switch (may be a lever) 40 is operated, a stop mode of the transparent mechanical reel 52 is determined according to the operation of the stop switch 65 and a group of stop tables to be used and the like are stored.

The stop switch 65 generates a stop command signal in response to an operation from a player. The slot machine 2 determines an internal winning combination by a lottery process based on random number sampling, and the CPU 30 stops the transparent mechanical reel 52 by transmitting signals to control stop of the transparent mechanical reels 52 based on the stop command signal sent from the stop switch 65 (each of three) and the determined stop table. This control may be similar to the control of the pachislot machine of the conventional technology.

Therefore, unlike the reel stop processing S05 of the gaming machine 1 according to a first embodiment, the transparent mechanical reel 52 is stopped by the above processing based on the a player's operation of stop switch 65. At the time of winning, like the conventional pachislot, medals may be given via the hopper 46, not in the form of giving credit.

Figure 27:
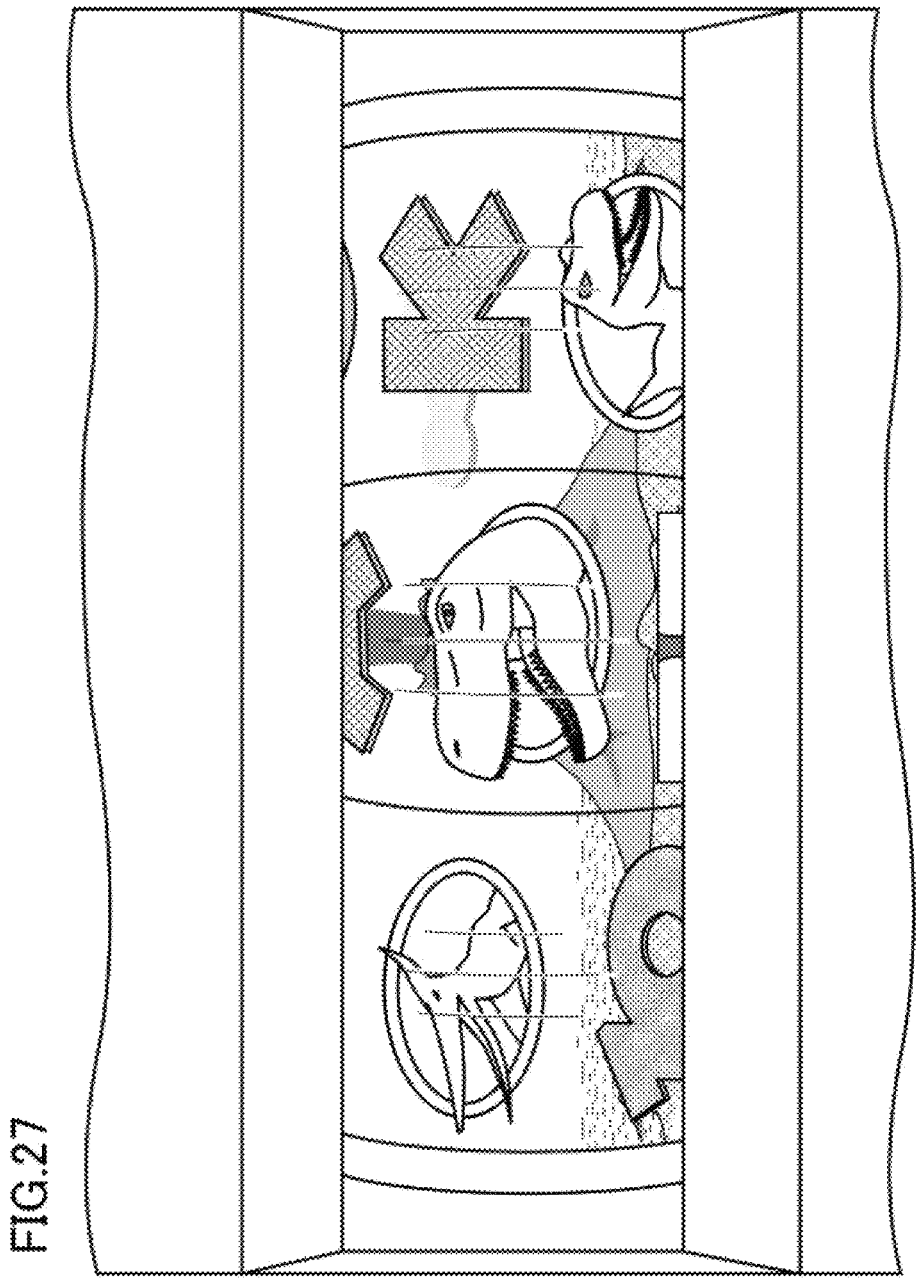
FIG. 27 is a diagram showing an example of the presentation in accordance with the second embodiment of the present invention.

FIG. 26 is a diagram showing symbol rows of the transparent mechanical reel 52 applied in the slot machine 2. Unlike the gaming machine 1, it may have an aspect without non-symbol transparent portion. Further, the symbol rows used in the slot machine 2 are those in which symbols are fixed at their positions, and unlike the gaming machine 1, an aspect in which the symbol is changed from "WILD" to "DOUBLE" is realized is not required. The game rendition in this case is shown in FIG. The surfaces of the transparent mechanical reels 52 may have two-layer structures as shown in FIGS. 6 and 7. In the example of FIG. 27, an image of a volcanic eruption is shown on the display 20 disposed inside the transparent mechanical reels 52, and an image behind the reels can be visually recognized by a player from the transparent portion on the surface other than each symbol arranged on the transparent mechanical reels 52. In the slot machine 2, it is possible to perform such an unprecedented rendition using the transparent mechanical reels 52 and the display 20 disposed inside the reels. This rendition can be used, for example, for presentation indicating a predictor of a jackpot or for presentation at the time of jackpot.

The present invention is not limited to the above-mentioned embodiments, and various improvements and modifications can be made without departing from the gist of the present invention. For example, in the gaming machine 1 of the first embodiment, the present invention may be applied to a gaming machine capable of stopping a spinning reel by a player's operation of a stop switch or the like.

EXPLANATION OF SIGN

1: gaming machine
2: slot machines
4*a*, 4*b*: side fixing plate
5: mechanical video reel unit
7 A to 7 C: reel spinning auxiliary body 7A1*a* to 7A1*e*, 7B1*a* to 7B1*e*, 7C1*a* to 7C1*e*: reel spinning auxiliary gears
20: display
21: image display area
22: display fixing plate
30: CPU
31: ROM
32: RAM
40: start switch
41: BET switch
42: credit storage portion
43: credit sensor
51*a* to *e*, 52*a, b, c*: transparent mechanical reel
53*a*: second layer reel strip
53*b*: first layer reel strip
54: reel strip
56: motor driving circuit
60, 60*a* to 60*e*: motors
61*a* to 61*e*: motor gears
65: stop switch
70: main control board
75: sub control board
111: symbol display area
511*a* to 511*e*: geared reel frame

What is claimed is:

1. A gaming machine comprising:
a plurality of transparent mechanical reels, a plurality of first symbols being arranged on each of the transparent mechanical reels;
a motor disposed on each of the transparent mechanical reels for spinning and stopping the transparent mechanical reels;
a symbol display area in which a part of the transparent mechanical reels is visually recognized;
a display that is arranged inside circumference of the transparent mechanical reels, is visually recognized through the transparent mechanical reels from a viewpoint of a player, and displays a plurality of video reels which correspond to the transparent mechanical reels, respectively, each of the video reels showing a plurality of second symbols; and
a processor causing to:
(a) in response to an operation by a player, generate a start signal,
(b) spin the transparent mechanical reels by the motor and display the video reels to be spun, in response to the start signal, and
(c) stop spinning the transparent mechanical reels and display the video reels to be stopped and provide an award to the player according to stop of the transparent mechanical reels and the video reels,
wherein a surface of the transparent mechanical reels on which the first symbols are placed or a whole of the transparent mechanical reels is formed by a transparent material, to allow a player to visually recognize the video reels displayed on the display behind the transparent mechanical reels through at least either of first symbols placed on the surface of the transparent mechanical reels shown in the symbol display area or periphery thereof when the display behind the transparent mechanical reels displays the video reels to be spun or stopped,
wherein a plurality of first frames and a plurality of second frames are formed uniformly at a predetermined interval on each of the transparent mechanical reels,
wherein the first symbols are placed on the first frames which are continuously placed, respectively,
wherein the second frames are continuously placed and are formed by a transparent material to form a non-symbol transparent portion for allowing the player to visually recognize the display behind the transparent mechanical reels in a transparent state, and
wherein the processor causes the display to display the second symbols of the video reels in a state where the non-symbol transparent portion of the transparent mechanical reels is stopped in front from the viewpoint of the player such that a symbol column being longer than a symbol column formed by the first symbols on each of the transparent mechanical reels is displayed.

2. The gaming machine of claim 1, wherein the processor combines a first symbol placed on the transparent mechanical reels and a second symbol displayed in the video reels to display a combined winning symbol.

3. The gaming machine of claim 1, wherein spinning of each of the transparent mechanical reels is carried out by engaging a gear provided on a front end portion of each of the transparent mechanical reels with a gear of the motor, and
an auxiliary body provided on outside of outer periphery of the transparent mechanical reels fixes a rotational position of each of the transparent mechanical reels and causes each of the transparent mechanical reels to be rotated to a fixed position.

4. The gaming machine of claim 1, wherein a surface of each of the mechanical reels is disposed outwardly from a center of rotation and each of the mechanical reels comprises at least two layers including a first reel strip of which part or whole is composed of a transparent material and a second reel strip disposed inside from the center.

5. The gaming machine of claim 1, wherein a number of the second frames in the non-symbol transparent portion is more than a number of frames in a vertical direction of the transparent mechanical reels shown in the symbol display area.

6. The gaming machine of claim 1, wherein when a predetermined condition is satisfied, a rendition of stopping the non-symbol transparent portions of all of the transparent mechanical reels in a whole of the symbol display area is performed such that the transparent mechanical reels displayed on the whole of the symbol display area is transparent.

7. The gaming machine of claim 6, wherein the rendition of stopping the non-symbol transparent portions of all of the transparent mechanical reels in the whole of the symbol display area is performed to allow the player to visually recognize the video reels of the display in a state where the symbol display area is transparent.

8. The gaming machine of claim 1, wherein the second symbols in each of the video reels include a plurality of symbol sets which are continuously arranged, and
wherein each of the symbol sets includes a plurality of third symbols corresponding to the first frames and a plurality of fourth symbols corresponding to the second frames.

9. The gaming machine of claim 8, wherein the third symbols included in a first symbol set among the symbol sets are same as the third symbols included in a second symbol set among the symbol sets, and the fourth symbols included in the first symbol set are different from the fourth symbols included in the second symbol set.

10. The gaming machine of claim 1, wherein a size in a horizontal direction of the display is substantially the same as or larger than a total value of widths of the transparent mechanical reels which are arranged horizontally.

* * * * *